US012586816B2

(12) United States Patent
Ji et al.

(10) Patent No.: US 12,586,816 B2
(45) Date of Patent: Mar. 24, 2026

(54) ENERGY STORAGE DEVICES WITH POLYMER ELECTROLYTES AND FILLERS

(71) Applicant: Enevate Corporation, Irvine, CA (US)

(72) Inventors: Liwen Ji, San Diego, CA (US); Benjamin Yong Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 903 days.

(21) Appl. No.: 16/724,094

(22) Filed: Dec. 20, 2019

(65) Prior Publication Data

US 2021/0194053 A1 Jun. 24, 2021

(51) Int. Cl.
| | |
|---|---|
| *H01M 4/38* | (2006.01) |
| *C08L 71/02* | (2006.01) |
| *H01G 11/26* | (2013.01) |
| *H01G 11/50* | (2013.01) |
| *H01G 11/56* | (2013.01) |
| *H01M 4/02* | (2006.01) |
| *H01M 10/0525* | (2010.01) |
| *H01M 10/0565* | (2010.01) |

(52) U.S. Cl.
CPC ......... *H01M 10/0565* (2013.01); *C08L 71/02* (2013.01); *H01G 11/26* (2013.01); *H01G 11/50* (2013.01); *H01G 11/56* (2013.01); *H01M 4/386* (2013.01); *H01M 10/0525* (2013.01); *C08L 2203/20* (2013.01); *C08L 2205/03* (2013.01); *H01M 2004/027* (2013.01); *H01M 2300/0082* (2013.01); *H01M 2300/0091* (2013.01)

(58) Field of Classification Search
CPC ............. H01M 10/0565; H01M 4/386; H01M 10/0525; H01M 2004/027; H01M 2300/0082; H01M 2300/0091; H01M 10/052; H01M 10/056; H01M 50/414; H01M 50/434; H01M 50/446; C08L 71/02; C08L 2203/20; C08L 2205/03; H01G 11/26; H01G 11/50; H01G 11/56; H01G 11/58
USPC ........................................................ 429/308
See application file for complete search history.

(56) References Cited

U.S. PATENT DOCUMENTS

| | | | | |
|---|---|---|---|---|
| 2004/0043298 | A1* | 3/2004 | Lee ..................... | H01M 10/052 429/323 |
| 2006/0003195 | A1* | 1/2006 | Noh ..................... | H01M 8/1053 429/534 |

(Continued)

FOREIGN PATENT DOCUMENTS

WO WO-2017035132 A1 * 3/2017

OTHER PUBLICATIONS

Rochliadi et al., Polymer Electrolyte Membranes Prepared by Blending of Poly(vinyl alcohol)-Poly(ethylene oxide) for Lithium Battery Application, (ICEVT & IMECE), 2015, p. 370-373. (Year: 2015).*

(Continued)

*Primary Examiner* — Christian Roldan
(74) *Attorney, Agent, or Firm* — McAndrews, Held & Malloy, Ltd.

(57) ABSTRACT

Energy storage devices comprising blend-based polymer electrolytes, a salt, and at least a filler are disclosed. The energy storage device comprises a first electrode and a second electrode, a blend-based membrane between the first electrode and the second electrode comprising two or more polymer electrolytes, and at least one filler.

12 Claims, 17 Drawing Sheets

(56) References Cited

U.S. PATENT DOCUMENTS

| 2006/0286446 A1* | 12/2006 | Chun | H01M 50/491 |
| | | | 429/251 |
| 2009/0148777 A1* | 6/2009 | Song | H01M 8/103 |
| | | | 526/272 |
| 2010/0219370 A1* | 9/2010 | Nakamura | C01G 51/42 |
| | | | 252/182.1 |
| 2012/0094189 A1* | 4/2012 | Scrosati | H01M 4/581 |
| | | | 429/314 |
| 2013/0071752 A1* | 3/2013 | Kanno | C01B 33/18 |
| | | | 252/182.1 |
| 2014/0186724 A1* | 7/2014 | Hammond | H01M 12/08 |
| | | | 427/535 |
| 2017/0133665 A1* | 5/2017 | Park | H01M 4/386 |
| 2017/0187063 A1 | 6/2017 | Pistorino et al. | |
| 2018/0048022 A1 | 2/2018 | Yang et al. | |
| 2018/0166680 A1* | 6/2018 | Ophir | H01M 4/366 |
| 2018/0287121 A1 | 10/2018 | Kim et al. | |
| 2019/0348658 A1 | 11/2019 | Ansari et al. | |

OTHER PUBLICATIONS

Casimir et al., Silicon-based anodes for lithium-ion batteries: Effectiveness of materials synthesis and electrode preparation, Elseivier, Nano Energy 27, 2016, 359-346. (Year: 2016).*

Rohatgi et al., Separator Membrane from Crosslinked Poly(Vinyl Alcohol) and Poly(Methyl Vynil Ether-alt-Maleic Anhydride, Nanomaterials, 2015, 5, 398-414. (Year: 2015).*

International Search Report, PCT/US2020/063447, dated Mar. 3, 2021, 9 pages.

International Preliminary Report on Patentability, PCT/US2020/063447, dated Jun. 30, 2022, 8 pages.

* cited by examiner

ENERGY STORAGE DEVICES WITH POLYMER ELECTROLYTES AND FILLERS

BACKGROUND

Field

The present application relates generally to electrolytes for energy storage devices. In particular, the present application relates to polymer electrolytes and fillers for use in lithium (Li)-ion energy storage devices.

Description of the Related Art

A lithium-ion battery typically includes a separator, or a membrane, and/or electrolyte between an anode and a cathode. In one class of batteries, the membrane, cathode and anode materials are individually formed into sheets or films. Sheets of the cathode, membrane and anode are subsequently stacked or rolled with the membrane separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the membrane between them.

Si is one of the most promising anode materials for Li-ion batteries due to its high specific gravimetric and volumetric capacity (3579 mAh/g and 2194 mAh/cm$^3$ vs. 372 mAh/g and 719 mAh/cm$^3$ for graphite), and low lithiation potential (<0.4 V vs. Li/Li$^+$). Among the various cathodes presently available, layered lithium transition-metal oxides such as Ni-rich Li[Ni$_x$Co$_y$Mn(Al)$_{1-x-y}$]O$_2$ (lithium nickel cobalt manganese oxide LiNiCoMnO$_2$ (NMC) cathode or lithium nickel cobalt aluminum oxide LiNiCoAlO$_2$ (NCA) cathode) are the most promising ones due to their high theoretical capacity (~280 mAh/g) and relatively high average operating potential (3.6 V vs Li/Li$^+$). Coupling Si anodes with high-voltage Ni rich NMC (or NCA) cathodes can deliver more energy than conventional Li-ion batteries with graphite-based anodes, due to the high capacity of these new electrodes.

The pairing between a Si-anode and a high-voltage Ni-rich cathode can improve the energy density of Li-ion batteries by making the batteries smaller. Electric vehicles can get a longer distance upon a single charge. However, both Si-based anodes and high-voltage Ni rich NMC (or NCA) cathodes face formidable technological challenges, and long-term cycling stability with high-Si anodes paired with NMC or NCA cathodes has yet to be achieved. Conventionally, the electrolytes for general Si anode-based batteries are organic, aprotic solvent-based liquid ones. Achieving stable cycling is hampered due to the large volume changes and unstable solid electrolyte interphase (SEI) layer of the Si-anode in liquid organic electrolytes. As the electrolytes are exposed to high temperatures and voltages, volatilization, flammability and explosion may occur. As a result, safety issues remain when organic liquid electrolytes are used in Li-ion batteries and Si anode-based batteries. The transition metal ion dissolutions and the structural change of Ni-rich cathodes in liquid organic electrolytes as well as the anodic instability of the conventional organic electrolytes, upon cycling, on the surface of the cathode may also degrade battery performance. Additionally, the general organic solvent-based liquid electrolytes may suffer from volatilization, flammability, explosion, and other issues.

For anodes, silicon-based materials can provide significant improvement in energy density. However, the large volumetric expansion (>300%) during the Li alloying and dealloying processes can lead to disintegration of the active material and the loss of electrical conduction paths, thereby reducing the cycling life of the battery. In addition, an unstable SEI layer can develop on the surface of the cycled anodes, and leads to an endless exposure of Si particle surfaces to the liquid electrolyte. This results in an irreversible capacity loss at each cycle due to the reduction at the low potential where the liquid electrolyte reacts with the exposed surface of the Si anode. In addition, oxidative instability of the conventional non-aqueous electrolyte takes place at voltages beyond 4.5 V, which can lead to accelerated decay of cycling performance. Because of the generally inferior cycle life of Si compared to graphite, only a small amount of Si or Si alloy is used in conventional anode materials.

NMC or NCA cathodes usually further suffer from an inferior stability and a low capacity retention at a high cut-off potential. The reasons can be ascribed to the unstable surface layer's gradual exfoliation, the continuous electrolyte decomposition, and the transition metal ion dissolution into electrolyte solution.

In order to make good use of Si anode//NMC or NCA cathode-based Li-ion battery systems, the aforementioned barriers need to be overcome. One strategy for overcoming these barriers includes exploring new electrolytes in order to make good use of Si anode//nickel-rich cathode-based full cells. The next generation of electrolytes to be developed should be able to form a uniform, stable SEI layer on the surface of Si anodes, with increased safety, energy density, thermal stability, and decreased impedance increase in electrode interfaces and gassing. Furthermore, good mechanical and thermal properties, along with good Li$^+$-ion conductivity are also important.

SUMMARY

In some aspects, energy storage devices are provided. In some embodiments, the energy storage device includes a first electrode and a second electrode, a blend-based membrane between the first electrode and the second electrode, a lithium (Li) salt such as lithium bis(trifluoromethanesulfonyl)imide (LiTFSI), and at least one filler. In some embodiments, the blend-based membrane comprises two or more polymer electrolytes.

In some embodiments, the blend-based membrane comprises two polymer electrolytes. In some embodiments, the blend-based membrane comprises three polymer electrolytes. In some embodiments, the two or more polymer electrolytes comprise a quasi-solid-state electrolyte or a polymer gel electrolyte. In some embodiments, the energy storage device further comprises a liquid electrolyte. The quasi-solid-state electrolyte and the polymer gel electrolyte can be fabricated by soaking an amount of liquid or standard electrolyte into the blend-based membrane.

In some embodiments, the blend-based membrane is selected from the group consisting of: PEO/PMVMA/PVA, PEO/PMVMA/cyclodextrin (CD), PEO/PMVMA/polyacrylamide (PAM), PEO/PMVMA/polysaccharide-based biopolymer, PEO/PMVMA/polyurethane (PU), PEO/PMVMA/R—OH, PEO/polyacrylic acid (PAA)/PVA, PEO/PAA/CD, PEO/PAA/PAM, PEO/PAA/polysaccharide-based biopolymer, PEO/PAA/PU, PEO/PAA/R—OH, PEO/Alginate/PVA, PEO/Alginate/CD, PEO/Alginate/PAM, PEO/Alginate/polysaccharide-based biopolymer, PEO/Alginate/PU, PEO/Alginate/R—OH, PEO/R—COOH/R'—OH, poly(vinylidene fluoride-co-hexafluoropropylene) (PVDF-HFP)/PMVMA/PVA, PVDF-HFP/PMVMA/CD, PVDF-HFP/PMVMA/PAM, PVDF-HFP/PMVMA/polysaccharide-based biopolymer, PVDF-HFP/PMVMA/PU, PVDF-HFP/PMVMA/R—OH, PVDF-HFP/PAA/PVA, PVDF-HFP/PAA/CD, PVDF-HFP/PAA/PAM, PVDF-HFP/PAA/polysaccharide-based biopolymer, PVDF-HFP/PAA/PU, PVDF-HFP/PAA/R—OH, PVDF-HFP/Alginate/PVA, PVDF-HFP/Alginate/CD, PVDF-HFP/Alginate/PAM, PVDF-HFP/Alginate/polysaccharide-based biopolymer, PVDF-HFP/Alginate/PU, PVDF-HFP/Alginate/R—OH, PVDF-HFP/R—COOH/R'—OH, polyacrlonitrle (PAN)/PMVMA/PVA, PAN/PMVMA/CD, PAN/PMVMA/PAM, PAN/PMVMA/polysaccharide-based biopolymer, PAN/PMVMA/PU, PAN/PMVMA/R—OH, PAN/PAA/PVA, PAN/PAA/CD, PAN/PAA/PAM, PAN/PAA/polysaccharide-based biopolymer, PAN/PAA/PU, PAN/PAA/R—OH, PAN/Alginate/PVA, PAN/Alginate/CD, PAN/Alginate/PAM, PAN/Alginate/polysaccharide-based biopolymer, PAN/Alginate/PU, PAN/Alginate/R—OH, PAN/R—COOH/R'—OH, poly(methyl methacrylate) (PMMA)/PMVMA/PVA, PMMA/PMVMA/CD, PMMA/PMVMA/PAM, PMMA/PMVMA/polysaccharide-based biopolymer, PMMA/PMVMA/PU, PMMA/PMVMA/R—OH, PMMA/PAA/PVA, PMMA/PAA/CD, PMMA/PAA/PAM, PMMA/PAA/polysaccharide-based biopolymer, PMMA/PAA/PU, PMMA/PAA/R—OH, PMMA/Alginate/PVA, PMMA/Alginate/CD, PMMA/Alginate/PAM, PMMA/Alginate/polysaccharide-based biopolymer, PMMA/Alginate/PU, PMMA/Alginate/R—OH, and PMMA/R—COOH/R'—OH.

In some embodiments, the filler is selected from the group consisting of: $SiO_2$, $Al_2O_3$, $TiO_2$, $Li_3N$, NiO, CuO, $CeO_2$, $Sm_2O_3$, Li-ion conductor, metal oxides, metal-organic frameworks (MOFs), and active ceramic particles.

In some embodiments, the first electrode is a cathode selected from the group consisting of: a Ni-rich lithium nickel cobalt manganese oxide $LiNiCoMnO_2$ (NMC) cathode, a Ni-rich lithium nickel cobalt aluminum oxide $LiNiCoAlO_2$ (NCA) cathode, a $LiCoO_2$ cathode, a lithium rich, $xLi_2Mn_3 \cdot (1-x)LiNi_aCo_bMn_cO_2$ cathode, a nickel-rich layered cobalt oxide ($LiNiCo_{1-x}O_2$) cathode, a nickel-rich layered manganese oxide ($LiNi_{1-x}Mn_xO_2$) cathode, a nickel-rich layered aluminum oxide ($LiNi_{1-x}Al_xO_2$) cathode, a lithium rich layered cobalt oxide ($LiNi_{1+x}Co_{1-x}O_2$) cathode, a lithium rich layered manganese oxide ($LiNi_{1+x}Mn_{1-x}O_2$) cathode, a lithium rich layered nickel oxide ($LiNi_2O_2$) cathode, a high-voltage spinel oxide ($LiNi_{0.5}Mn_{1.5}O_4$) cathode, a high-voltage phosphate cathode, a high-voltage sulfate cathode, and a high-voltage silicate cathode.

In some embodiments, the second electrode is a Si-based anode. In some embodiments, the polymer electrolyte includes a quasi-solid-state electrolyte or a polymer gel electrolyte. In some embodiments, second electrode is a Si-dominant electrode.

In some embodiments, the second electrode is a high-energy-density high-loading anode. In some embodiments, the second electrode has a total capacity loading of equal to or above about 10 $mAh/cm^2$, about 11 $mAh/cm^2$, about 11.5 $mAh/cm^2$, about 12 $mAh/cm^2$, or about 13 $mAh/cm^2$. In some embodiments, the energy storage device has a cycled capacity of equal to or above about 4 $mAh/cm^2$, about 5 $mAh/cm^2$, or about 6 $mAh/cm^2$ for each electrode.

DETAILED DESCRIPTION

Figure 1:
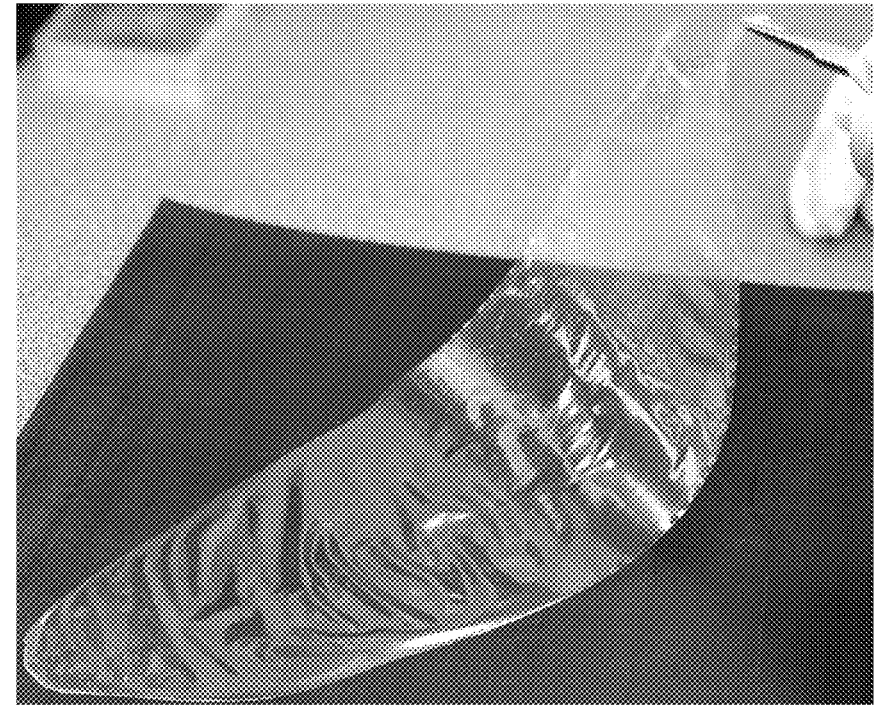
FIG. 1 shows a synthesized trinary PEO/PMVMA/PVA blend-based membrane loaded with $SiO_2$ and LiTFSI.

Silicon is one of the most promising anode materials for high energy density Li-ion batteries due to its high gravimetric capacity and low average potential for lithiation and delithiation. Silicon-based composite electrodes, comprised of silicon particles suspended in a carbon matrix could provide superior energy density to industry-standard graphite electrodes if paired with high-voltage high capacity cathodes, such as NMC and NCA. However, serious challenges, including particle pulverization caused by volume expansion and an unstable SEI layer during prolonged cycling, remain. Organic solvent-based electrolytes cause repetitive exposure of fresh surface in Si anode to liquid electrolytes, causing the formation and growth of the SEI layer, the continuous decomposition of the electrolyte, and low Coulombic efficiency. When the solvent-based electrolytes are paired with high-voltage nickel-rich cathodes (such as NMC and NCA), the oxidation of the electrolyte, the dissolution of transition metal ions, and the subsequent crystal structural damage further reduce battery performance.

One strategy for overcoming these problems involve stabilizing interphases between the electrolyte and both anode and NMC or NCA cathode through adopting new electrolytes and fillers into the membrane between the two electrodes One such electrolyte is a pure solid-state electrolyte. SEI layer usually does not form on the surface of Si anode in pure solid-state electrolytes because only Li ions are mobile and reactants required for SEI formation are not supplied to the Si anode surface. Morphological changes in Si-based anode are prevented in solid-state electrolytes since Si anodes are confined to a limited space formed between the current collector and solid-state polymer electrolyte membrane. In a pure solid-state electrolyte, lithium salts are dissolved and solvated by the polymer chains. The general requirements for solid-state polymer electrolytes are: (i) possess high ionic conductivity, (ii) thermal and electrochemical stability, and (iii) excellent mechanical properties and dimensional stability. However, sufficiently high $Li^+$-ion conductivity at room temperature heavily hampers the $Li^+$-ion transports.

Other solid-state electrolytes, such as polymer electrolytes, can overcome some problems in the Li-ion batteries caused by the organic liquid electrolytes, including leakage of organic solvents and flammability as well as problems caused by inorganic solid electrolytes, including poor mechanical properties and low elastic moduli. For example, for polymer electrolytes, there is an absence of volatility or flammability. Furthermore, polymer electrolytes have better mechanical properties, high elastic module, lower cost in materials, production, and processing.

Thus, polymer electrolytes are expected to be safer than liquid electrolytes. Solid-state electrolytes can minimize the amount of liquid electrolyte in quasi-solid cells and polymer gel electrolyte-based cells in which only a small amount of liquid electrolyte is added into solid-state polymer electrolytes to help improve safety and performance. Thus, quasi-solid-state electrolytes and polymer gel electrolytes can preserve these advantages.

For Ni-rich NMC or NCA cathodes, dissolution, migration and incorporation processes involving the transition metal ions can be minimized or prevented in systems with polymer electrolytes (including quasi-solid-state electrolytes and polymer gel electrolytes). This decelerates the depletion of cyclable Li ions and diminish cell performance deterioration.

The quasi-solid-state electrolytes or polymer gel electrolytes can be used to provide advantages for all Li-ion batteries, regardless of the type of anode and cathode. Thus, an energy storage device comprises a first electrode and a second electrode, a blend-based membrane between the first electrode and the second electrode, wherein the blend-based membrane comprising two or more polymer electrolytes, lithium bis(trifluoromethanesulfonyl)imide (LiTFSI) and at least one filler can be implemented. In addition, the blend-based membrane acts as a separator in the energy storage device.

Systems with quasi-solid-state polymer electrolytes and systems with polymer gel electrolytes can be fabricated by soaking an amount of liquid electrolyte into solid-state polymer electrolyte membrane). For example, the amount can be more than about 10 μl of liquid electrolyte or standard electrolyte such as a lithium salt dissolved in organic solvent. In some embodiments, the amount can be about 10 μl, about 20 μl, about 30 μl, about 40 μl, about 50 μl, about 60 μl, about 70 μl, about 80 μl, about 90 μl, about 100 μl, about 150 μl, about 200 μl, about 250 μl, about 300 μl, about 350 μl, or about 400 μl or more of liquid electrolyte or standard electrolyte. These systems can be used to improve the conductivity before systems with fully solid-state polymer electrolytes are realized. Systems with quasi-solid-state polymer electrolytes can be considered as systems with gel-electrolytes.

In some embodiments, the first electrode is selected from the group consisting of: a Ni-rich lithium nickel cobalt manganese oxide $LiNiCoMnO_2$ (NMC) cathode, a Ni-rich lithium nickel cobalt aluminum oxide $LiNiCoAlO_2$ (NCA) cathode, a $LiCoO_2$ cathode, a lithium rich, $xLi_2Mn_3 \cdot (1-x)$ $LiNi_aCo_bMn_cO_2$ cathode, a nickel-rich layered cobalt oxide $(LiNi_{1-x}Co_xO_2)$ cathode, a nickel-rich layered manganese oxide $(LiNi_{1-x}Mn_xO_2)$ cathode, a nickel-rich layered aluminum oxide $(LiNi_{1-x}Al_xO_2)$ cathode, a lithium rich layered cobalt oxide $(LiNi_{1+x}Co_{1-x}O_2)$ cathode, a lithium rich layered manganese oxide $(LiNi_{1+x}Mn_{1-x}O_2)$ cathode, a lithium rich layered nickel oxide $(LiNi_2O_2)$ cathode, a high-voltage spinel oxide $(LiNi_{0.5}Mn_{1.5}O_4)$ cathode, a high-voltage phosphate cathode, a high-voltage sulfate cathode, and a high-voltage silicate cathode. For example, a, b, and c can represent any integer. For example, x can be less than or equal to 1.

In some embodiments, the second electrode is an anode selected from the following: a silicon (Si)-based electrode, a graphite electrode, a carbon-based electrode, an alloy electrode comprising Si, germanium (Ge), tin (Sn), or antimony (Sb), a titanium oxide electrode, a metal oxides electrode, a metal fluorine electrode, a metal phosphide electrode, a metal sulfide electrode, and a metal nitride electrode. In some embodiments, the second electrode is a Si-based electrode. In some embodiments, the second electrode is a Si-based anode, more preferably, a Si-dominant anode.

In some embodiments, the blend-based membrane is selected from the group consisting of: PEO/PMVMA/PVA, PEO/PMVMA/cyclodextrin (CD), PEO/PMVMA/polyacrylamide (PAM), PEO/PMVMA/polysaccharide-based biopolymer, PEO/PMVMA/polyurethane (PU), PEO/PMVMA/R—OH, PEO/polyacrylic acid (PAA)/PVA, PEO/PAA/CD, PEO/PAA/PAM, PEO/PAA/polysaccharide-based biopolymer, PEO/PAA/PU, PEO/PAA/R—OH, PEO/Alginate/PVA, PEO/Alginate/CD, PEO/Alginate/PAM, PEO/Alginate/polysaccharide-based biopolymer, PEO/Alginate/PU, PEO/Alginate/R—OH, PEO/R—COOH/R'—OH, poly(vinylidene fluoride-co-hexafluoropropylene) (PVDF-HFP)/PMVMA/PVA, PVDF-HFP/PMVMA/CD, PVDF-HFP/PMVMA/PAM, PVDF-HFP/PMVMA/polysaccharide-based biopolymer, PVDF-HFP/PMVMA/PU, PVDF-HFP/PMVMA/R—OH, PVDF-HFP/PAA/PVA, PVDF-HFP/PAA/CD, PVDF-HFP/PAA/PAM, PVDF-HFP/PAA/polysaccharide-based biopolymer, PVDF-HFP/PAA/PU, PVDF-HFP/PAA/R—OH, PVDF-HFP/Alginate/PVA, PVDF-HFP/Alginate/CD, PVDF-HFP/Alginate/PAM, PVDF-HFP/Alginate/polysaccharide-based biopolymer, PVDF-HFP/Alginate/PU, PVDF-HFP/Alginate/R—OH, PVDF-HFP/R—COOH/R'—OH, polyacrlonitrle (PAN)/PMVMA/PVA, PAN/PMVMA/CD, PAN/PMVMA/PAM, PAN/PMVMA/polysaccharide-based biopolymer, PAN/PMVMA/PU, PAN/PMVMA/R—OH, PAN/PAA/PVA, PAN/PAA/CD, PAN/PAA/PAM, PAN/PAA/polysaccharide-based biopolymer, PAN/PAA/PU, PAN/PAA/R—OH, PAN/Alginate/PVA, PAN/Alginate/CD, PAN/Alginate/PAM, PAN/Alginate/polysaccharide-based biopolymer, PAN/Alginate/PU, PAN/Alginate/R—OH, PAN/R—COOH/R'—OH, poly(methyl methacrylate) (PMMA)/PMVMA/PVA, PMMA/PMVMA/CD, PMMA/PMVMA/PAM, PMMA/PMVMA/polysaccharide-based biopolymer, PMMA/PMVMA/PU, PMMA/PMVMA/R—OH, PMMA/PAA/PVA, PMMA/PAA/CD, PMMA/PAA/PAM, PMMA/PAA/polysaccharide-based biopolymer, PMMA/PAA/PU, PMMA/PAA/R—OH, PMMA/Alginate/PVA, PMMA/Alginate/CD, PMMA/Alginate/PAM, PMMA/Alginate/polysaccharide-based biopolymer, PMMA/Alginate/PU, PMMA/Alginate/R—OH, and PMMA/R—COOH/R'—OH.

In some embodiments, polysaccharide-based biopolymer is selected from the group consisting of: starch, cellulose, chitin, shitosan, xanthan gum, guar gun, and pullalan.

In some embodiments, the blend-based membrane is selected from the group consisting of: PEO/Alginate, PEO/

HOOC—R—OH, PVDF-HFP/Alginate, PVDF-HFP/HOOC—R—OH, PAN/Alginate, PAN/HOOC—R—OH, PMMA/Alginate, and PMMA/HOOC—R—OH.

$Li^+$-ion conductivity of the polymer electrolytes can be enhanced by incorporating at least one filler into the polymer electrolyte membrane to form a polymer blend-based composite. In some embodiments, the fillers are inorganic. In some embodiments, the fillers can kinetically impede the reorganization of polymer chains and facilitate the dissociation of Li salt and the motion of $Li^+$-ions. The physical properties of the inorganic-organic hybrid electrolyte system, such as thermal and mechanical stabilities, can be modulated. In some embodiments, the filler is selected from the group consisting of: $SiO_2$, $Al_2O_3$, $TiO_2$, $Li_3N$, NiO, CuO, $CeO_2$, $Sm_2O_3$, Li-ion conductor, metal oxides, metal-organic frameworks (MOFs), and an active ceramic particle.

In some embodiments, the active ceramic particle filler can be selected from the group consisting of: LISICON-type ceramics, sodium superionic conductors (NASICONs)-type ceramics, Garnet-like structural ceramics, oxide based perovskite-type ceramics, sulfide based glassy and glass-ceramics, Thio-LiSICONS ceramics, LiPON-based ceramic, Li argyrodite, $Li_3PO_4$, $Li_3N$, Li halide, and Li hydride. In some embodiments, the filler is an active filler. In some embodiments, the filler is an inactive filler.

In some embodiments, the second electrode is a high-energy-density high-loading anode. In some embodiments, the second electrode has a total capacity loading of equal to or above about 10 $mAh/cm^2$, about 11 $mAh/cm^2$, about 11.5 $mAh/cm^2$, about 12 $mAh/cm^2$, or about 13 $mAh/cm^2$. In some embodiments, the energy storage device has a cycled capacity of equal to or above about 4 $mAh/cm^2$, about 5 $mAh/cm^2$, or about 6 $mAh/cm^2$ for each electrode.

Energy Storage Device

The polymer electrolytes and at least one filler described herein may be advantageously utilized within an energy storage device. Energy storage devices may include batteries, capacitors, and battery-capacitor hybrids. In some implementations, the energy storage device is a Li-ion battery. The energy storage device comprises a first electrode and a second electrode, such as a cathode and an anode. For a Li-ion battery, any electrodes suitable for a Li-ion battery can be used. In some embodiments, at least one electrode may be a Si-based electrode. In some embodiments, the Si-based electrode is a Si-dominant electrode, where silicon is the majority of the active material used in the electrode (e.g., greater than 50% silicon). In some implementations, the energy storage device comprises a blend-based membrane, and the membrane is between the first electrode and the second electrode.

In some embodiments, the energy storage device comprises two or more polymer electrolyte. In some embodiments, the polymer electrolyte can be a quasi-solid-state electrolyte or a gel electrolyte. In some embodiments, the quasi-solid-state electrolyte or the polymer gel electrolyte can be fabricated by soaking an amount of liquid or standard electrolyte into the membrane. For example, the polymer electrolyte comprises 100 μl liquid electrolyte with the formulation of 0.45 M LiTFSI in FEC/EMC (3/7 wt %). For example, the polymer electrolyte comprises 100 μl standard electrolyte with the formulation of 1.2 M $LiPF_6$ in FEC/EMC (3/7 wt %).

Electrodes

In some embodiments, the first electrode is a cathode. The cathode for the energy storage device may include Li transition metal oxide cathode materials, such as Lithium cobalt oxide ($LiCoO_2$) (LCO), lithium (Li)-rich oxides/layer oxides, nickel (Ni)-rich oxide/layered oxides, high-voltage spinel oxides, and high-voltage polyanionic compounds. Ni-rich oxides/layered oxides may include lithium nickel cobalt manganese oxide ($LiNi_xCo_yMn_zO_2$, x+y+z=1, "NMC"), lithium nickel cobalt aluminum oxide ($LiNi_aCo_bAl_cO_2$, a+b+c=1, "NCA"), $LiNi_{1-x}M_xO_2$ and $LiNi_{1+x}M_{1-x}O_2$ (where M=Co, Mn or Al). Examples of a NMC material include $LiNi_{0.6}Co_{0.2}Mn_{0.2}O_2$ (NMC-622), NMC-111, NC-433, NMC-523, NMC-811, and NMC-9 0.5 0.5. Li-rich oxides/layered oxides may include $Li_yNi_{1+x}M_{1-x}O_2$ (where y>1, and M=Co, Mn or Al), $xLi_2MnO_3 \cdot (1-x)LiNi_aCo_bMn_cO_2$, and $xLi_2Mn_3O_2 \cdot (1-x)LiNi_aCo_bMn_cO_2$. High-voltage spinel oxides may include lithium manganese spinel ($LiMn_2O_4$, "LMO") or lithium nickel manganese spinel ($LiNi_{0.5}Mn_{1.5}O_4$, "LNMO"). High-voltage polyanionic compounds may include phosphates, sulfates, silicates, titanate, etc. One example of polyanionic compound may be lithium iron phosphate ($LiFePO_4$, "LFP").

The second electrode may be an anode. The anode can be any type that is suitable for a Li-ion battery. For example, the anode may be a graphite electrode, a carbon-based electrode, an alloy electrode comprising Si, germanium (Ge), tin (Sn), or antimony (Sb), etc., a titanium oxide electrode, a metal oxides electrode, a metal fluorine electrode, a metal phosphide electrode, a metal sulfide electrode, or a metal nitride electrode. The metal for the metal oxides electrode, the metal fluorine electrode, the metal phosphide electrode, the metal sulfide electrode, and the metal nitride electrode may be Fe, Co, Ni, Mn, Cu, Cr, Mo, etc.

In some implementations, in order to increase volumetric and gravimetric energy density of Li-ion batteries, silicon may be used as the active material for the anode. Thus, the anode for the energy storage device include Si-based anode. Several types of silicon materials, e.g., silicon nanopowders, silicon nanofibers, porous silicon, and ball-milled silicon, are viable candidates as active materials for the anode. Alternatively, as described in U.S. patent application Ser. Nos. 13/008,800 and 13/601,976, entitled "Composite Materials for Electrochemical Storage" and "Silicon Particles for Battery Electrodes," a Si-based anode can also contain a composite material film that includes Si particles distributed in a carbon phase. The Si-based anode can include one or more types of carbon phases. At least one of these carbon phases is a substantially continuous phase that extends across the entire film and holds the composite material film together. The Si particles are distributed throughout the composite material film.

The composite material film may be formed by pyrolyzing a mixture comprising a precursor (such as a polymer or a polymer precursor) and Si particles. The mixture can optionally further contain graphite particles. Pyrolyzation of the precursor forms a pyrolytic carbon and results in one or more type of carbon phases. In some implementations, the composite material film can have a self-supporting monolithic structure, and therefore is a self-supporting composite material film. Because the precursor is converted into an electrically conductive and electrochemically active matrix, the resulting electrode is conductive enough that, in some cases, a metal foil or mesh current collector can be omitted or minimized. The converted polymer also acts as an expansion buffer for Si particles during cycling so that a high cycle life can be achieved. In certain implementations, the resulting electrode is an electrode that is comprised substantially of active material. The electrodes can have a high energy density of between about 500 mAh/g to about 1200 mAh/g.

The composite material film may also be used as a cathode active material in some electrochemical couples with additional additives.

The amount of carbon obtained from the precursor can be from about 2% to about 50%, from about 2% to about 40%, from about 2% to about 30%, from about 2% to about 25%, or from about 2% to about 20% by weight of the composite material. The carbon is obtained through heating a carbon-containing precursor at a temperature sufficient for pyrolysis of the precursor to occur, and is thus a pyrolytic carbon. The carbon from the precursor can be hard and/or soft carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. The hard carbon phase can be a matrix phase in the composite material. The hard carbon can also be embedded in the pores of the additives including silicon. The hard carbon may react with some of the additives to create some materials at interfaces. For example, there may be a silicon carbide layer or silicon carbide containing oxygen (Si—C—O) layer between silicon particles and the pyrolytic carbon. Possible pyrolytic carbon precursors can include polyimide (or a polyimide precursor), other aromatic polyimides, phenolic resins, epoxy resins, poly(p-phenylene vinylene) (PPV), poly(p-phenylene-1,3,4-oxadiazole) (POD), benzimidazobenzophenanthroline ladder (BBL) polymer, and other polymers that have a very high melting point or are cross-linked.

The amount of Si particles in the composite material may be between greater than 0% and about 90% by weight, between about 20% and about 80%, between about 30% and about 80%, or between about 40% and about 80%. In some implementations, the amount of Si particles in the composite material may be between about 50% and about 90% by weight, between about 50% and about 80%, or between about 50% and about 70%, and such anode is considered as a Si-dominant anode. The amount of one or more types of carbon phases in the composite material may be between greater than 0% and about 90% by weight or between about 1% and about 70% by weight. The pyrolyzed/carbonized polymer can form a substantially continuous conductive carbon phase in the entire electrode as opposed to particulate carbon suspended in a non-conductive binder in one class of conventional lithium-ion battery electrodes.

The largest dimension of the silicon particles can be less than about 40 µm, less than about 1 µm, between about 10 nm and about 40 µm, between about 10 nm and about 1 µm, less than about 500 nm, less than about 100 nm, and about 100 nm. All, substantially all, or at least some of the silicon particles may comprise the largest dimension described above. For example, an average or median largest dimension of the silicon particles can be less than about 40 µm, less than about 1 µm, between about 10 nm and about 40 µm, between about 10 nm and about 1 µm, less than about 500 nm, less than about 100 nm, and about 100 nm. Furthermore, the silicon particles may or may not be pure silicon. For example, the silicon particles may be substantially silicon or may be a silicon alloy. The silicon alloy includes silicon as the primary constituent along with one or more other elements.

Micron-sized silicon particles can provide good volumetric and gravimetric energy density combined with good cycle life. In certain implementations, to obtain the benefits of both micron-sized silicon particles (e.g., high energy density) and nanometer-sized silicon particles (e.g., good cycle behavior), silicon particles can have an average particle size in the micron range and a surface including nanometer-sized features. The silicon particles have an average particle size (e.g., average diameter or average largest dimension) between about 0.1 µm and about 30 µm or between about 0.1 µm and all values up to about 30 µm. For example, the silicon particles can have an average particle size between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size can be any value between about 0.1 µm and about 30 µm, e.g., about 0.1 µm, about 0.5 µm, about 1 µm, about 5 µm, about 10 µm, about 15 µm, about 20 µm, about 25 µm, and about 30 µm.

Optionally, conductive particles that may also be electrochemically active are added to the mixture. Such particles can enable both a more electronically conductive composite as well as a more mechanically deformable composite capable of absorbing the large volumetric change incurred during lithiation and de-lithiation. A largest dimension of the conductive particles is between about 10 nanometers and about 100 microns. All, substantially all, or at least some of the conductive particles may comprise the largest dimension described herein. In some implementations, an average or median largest dimension of the conductive particles is between about 10 nm and about 100 microns. The mixture may include greater than 0% and up to about 80% by weight conductive particles. The composite material may include about 45% to about 80% by weight conductive particles. The conductive particles can be conductive carbon including carbon blacks, carbon fibers, carbon nanofibers, carbon nanotubes, graphite, graphene, etc. Many carbons that are considered as conductive additives that are not electrochemically active become active once pyrolyzed in a polymer matrix. Alternatively, the conductive particles can be metals or alloys, such as copper, nickel, or stainless steel.

For example, graphite particles can be added to the mixture. Graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than pyrolytic carbon, in certain directions of force, and can better absorb the volume expansion of silicon additives. Preferably, a largest dimension of the graphite particles is between about 0.5 microns and about 100 microns. All, substantially all, or at least some of the graphite particles may comprise the largest dimension described herein. In some implementations, an average or median largest dimension of the graphite particles is between about 0.5 microns and about 100 microns. The mixture may include about 2% to about 50% by weight of graphite particles. The composite material may include about 40% to about 75% by weight graphite particles.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In some embodiments, the full capacity of the composite material may not be utilized during use of the battery to improve battery life (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 2000 mAh/g, while the composite material may only be used up to a gravimetric capacity of about 550 to about 850 mAh/g. Although, the maximum gravimetric capacity of the composite material may not be utilized, using the composite material at a lower capacity can still achieve a higher capacity than certain lithium ion batteries. In certain embodiments, the composite material is used or only used at a gravimetric capacity below about 70% of the composite material's maximum gravimetric capacity. For example, the composite material is not used at a gravimetric capacity above about 70% of the composite material's maximum gravimetric capacity. In further embodiments, the composite material is used or only used at a gravimetric capacity below about 50% of the composite material's maximum gravimetric capacity or below about 30% of the composite material's maximum gravimetric capacity.

Blend-Based Membrane

In some embodiments, the blend-based membrane comprises two or more polymer electrolytes. In some embodiments, the blend-based membrane comprises two polymer electrolytes. In some embodiments, the blend-based membrane comprises three polymer electrolytes. In some embodiments, the blend-based membrane further comprises one or more fillers.

Polymer Electrolytes

Poly(ethylene oxide) (PEO) is a solid-state polymer and has capability of dissolving Li salts and high ionic conductivity at high temperature. In some embodiments, PEO can be used as a polymer electrolyte. Poly(vinyl alcohol) (PVA) comprises —OH group and exhibit film-forming characteristics, hydrophilic properties and high density of relative chemical functions that are favorable for cross-linking using thermal treatments. PVA further exhibits interaction ability with complimentary polymers. In some embodiments, PVA can be used as a polymer electrolyte. In some embodiments, other polymers with —OH group or —NH2 group can also be selected as a polymer electrolyte.

Poly(methyl vinyl ether-alt-maleic anhydride) (PMVMA) possess —COOH group and can act as a cross-linking agent for —OH or —NH2 group-containing polymers to obtain three-dimensional networks in polymer blends. The maleic acid or —COOH groups can react with —OH group or —NH$_2$ group. In some embodiments, PMVMA can be used as a polymer electrolyte. In some embodiments, other polymers with —COOH group can be selected as a polymer electrolyte.

In addition, the maleic acid group in PMVMA or the —COOH groups in other polymers could help hydrolyze tetraethyl orthosilicate (TEOS) or other metal salts (such as some Ti salts, some Al salts) to form uniformly distributed fillers (such as SiO$_2$, TiO$_2$, Al$_2$O$_3$, NiO, CuO, CeO$_2$, Sm$_2$O$_3$, other metal oxides, and metal-organic frameworks). For example, the acidic groups can take the place of formic acid used to hydrolyze TEOS to obtain SiO$_2$ to prepare polymer/SiO$_2$-based composite membranes. It is contemplated that this method can help reduce impurities in the polymer blend membrane and enhance the uniform distribution of Si powders among polymer blend-based membranes.

In some embodiments, cyclodextrin (CD) is used as a polymer electrolyte. In some embodiments, polyacrylamide (PAM) is used as a polymer electrolyte. In some embodiments, a polysaccharide-based biopolymer blend is used as a polymer electrolyte. The polysaccharide-based biopolymer blend can, for example, include starch, cellulose, chitin, chitosan, xanthan gum, guar gum, and pullalan. In some embodiments, polyurethane is used as a polymer electrolyte. In some embodiments, R—OH blend membrane is used as a polymer electrolyte. R—OH represents polymers with —OH branch groups and can be dissolved in solvents.

In some embodiments, polyacrylic acid (PAA) is used as a polymer electrolyte. In some embodiments, alginate is used as a polymer electrolyte. In some embodiments, R—COOH is used in as a polymer electrolyte. R—COOH represents polymers with —COOH branch groups and can be dissolved in solvents. In some embodiments, R—COOH and R'—OH are used as polymer electrolytes together. R and R' represent different functional groups. In some embodiments, HOOC—R—OH is used as a polymer electrolyte. HOOC—R—OH represents polymers with —COOH and —OH groups and can be dissolved in solvents.

In some embodiments, poly(vinylidene fluoride-co-hexafluoropropylene) (HVDF-HFP) is used as a polymer electrolyte. In some embodiments, polyacrylonitrile (PAN) is used as a polymer electrolyte. In some embodiments, poly(methyl methacrylate) (PMMA) is used as a polymer electrolyte.

In some embodiments, the polymer electrolyte comprises a quasi-solid-state electrolyte or a polymer gel electrolyte. In some embodiments, the quasi-solid-state electrolyte or the polymer gel electrolyte can be fabricated by soaking a certain amount of liquid electrolyte into the blend-based membrane.

In some embodiments, when the blend-based membrane comprises three polymer electrolytes (trinary polymer membrane), the trinary polymer membrane combination can be: PEO/PMVMA/PVA, PEO/PMVMA/CD, PEO/PMVMA/PAM, PEO/PMVMA/polysaccharide-based biopolymer, PEO/PMVMA/PU, PEO/PMVMA/R—OH, PEO/PAA/PVA, PEO/PAA/CD, PEO/PAA/PAM, PEO/PAA/polysaccharide-based biopolymer, PEO/PAA/PU, PEO/PAA/R—OH, PEO/Alginate/PVA, PEO/Alginate/CD, PEO/Alginate/PAM, PEO/Alginate/polysaccharide-based biopolymer, PEO/Alginate/PU, PEO/Alginate/R—OH, or PEO/R—COOH/R'—OH.

The PEO of the combinations shown in the previous paragraph can be substituted by PVDF-HFP, PAN, PMMA or other polymers with relatively high Li$^+$-ion conductivity.

For example, in some embodiments, the trinary polymer membrane combination can be: PVDF-HFP/PMVMA/PVA, PVDF-HFP/PMVMA/CD, PVDF-HFP/PMVMA/PAM, PVDF-HFP/PMVMA/polysaccharide-based biopolymer, PVDF-HFP/PMVMA/PU, PVDF-HFP/PMVMA/R—OH, PVDF-HFP/PAA/PVA, PVDF-HFP/PAA/CD, PVDF-HFP/PAA/PAM, PVDF-HFP/PAA/polysaccharide-based biopolymer, PVDF-HFP/PAA/PU, PVDF-HFP/PAA/R—OH, PVDF-HFP/Alginate/PVA, PVDF-HFP/Alginate/CD, PVDF-HFP/Alginate/PAM, PVDF-HFP/Alginate/polysaccharide-based biopolymer, PVDF-HFP/Alginate/PU, PVDF-HFP/Alginate/R—OH, or PVDF-HFP/R—COOH/R'—OH.

For example, in some embodiments, the trinary polymer membrane combination can be: PAN/PMVMA/PVA, PAN/PMVMA/CD, PAN/PMVMA/PAM, PAN/PMVMA/polysaccharide-based biopolymer, PAN/PMVMA/PU, PAN/PMVMA/R—OH, PAN/PAA/PVA, PAN/PAA/CD, PAN/PAA/PAM, PAN/PAA/polysaccharide-based biopolymer, PAN/PAA/PU, PAN/PAA/R—OH, PAN/Alginate/PVA, PAN/Alginate/CD, PAN/Alginate/PAM, PAN/Alginate/polysaccharide-based biopolymer, PAN/Alginate/PU, PAN/Alginate/R—OH, or PAN/R—COOH/R'—OH.

For example, in some embodiments, the trinary polymer membrane combination can be: PMMA/PMVMA/PVA, PMMA/PMVMA/CD, PMMA/PMVMA/PAM, PMMA/PMVMA/polysaccharide-based biopolymer, PMMA/PMVMA/PU, PMMA/PMVMA/R—OH, PMMA/PAA/PVA, PMMA/PAA/CD, PMMA/PAA/PAM, PMMA/PAA/polysaccharide-based biopolymer, PMMA/PAA/PU, PMMA/PAA/R—OH, PMMA/Alginate/PVA, PMMA/Alginate/CD, PMMA/Alginate/PAM, PMMA/Alginate/polysaccharide-based biopolymer, PMMA/Alginate/PU, PMMA/Alginate/R—OH, and PMMA/R—COOH/R'—OH.

In some embodiments, when the blend-based membrane comprises two polymer electrolytes (binary polymer membrane), the binary membrane combination can be: PEO/Alginate or PEO/HOOC—R—OH.

The PEO of the combinations shown in the previous paragraph can be substituted by PVDF-HFP, PAN, PMMA or other polymers with relatively high Li$^+$-ion conductivity.

For example, in some embodiments, the binary polymer membrane combination can include, but are not limited to: PVDF-HFP/Alginate or PVDF-HFP/HOOC—R—OH. For example, in some embodiments, the binary membrane combination can be: PAN/Alginate or PAN/HOOC—R—OH. For example, in some embodiments, the binary membrane combination can include, but are not limited to: PMMA/Alginate or PMMA/HOOC—R—OH.

Fillers

In some embodiments, the energy storage device comprise at least one filler. In some embodiments, the energy storage device comprises two fillers. In some embodiments, the fillers are inorganic fillers. In some embodiments, the fillers are inactive fillers. In some embodiments, the fillers can include, but are not limited to: $SiO_2$, $Al_2O_3$, $TiO_2$, $Li_3N$, NiO, CuO, $CeO_2$, $Sm_2O_3$, metal oxides, Li-ion conductor, or metal-organic frameworks (MOFs).

In some embodiments, the fillers are active ceramic particles. In some embodiments, the ceramic particles include, but are not limited to: LISICON-type ceramics, sodium superionic conductors (NASICONs)-type ceramics, Garnet-like structural ceramics, oxide based perovskite-type ceramics, sulfide based glassy and glass-ceramics, Thio-LiSICONS ceramics, LiPON (lithium phosphorus oxynitride)-based ceramic, Li argyrodite, $Li_3PO_4$, $Li_3N$, Li halide, and Li hydride.

In some embodiments, Li-ion conductor includes LiPON, NASICON-type phosphate glass ceramics (LAGP), $Li_{6.4}La_3Zr_{1.4}Ta_{0.6}O_{12}$ (LLZTO), and $Li_7La_3Zr_2O_{12}$ (LLZO).

Liquid Electrolyte

In some implementations, a liquid electrolyte may be added to the energy storage device comprising a blend-based membrane. The liquid electrolyte include any standard electrolyte that can be used with Li-ion batteries. The liquid electrolyte may include a solvent comprising a cyclic carbonate and/or a linear carbonate. In some implementations, the cyclic carbonate is a fluorine-containing cyclic carbonate. Examples of the cyclic carbonate include fluoroethylene carbonate (FEC), di-fluoroethylene carbonate (DiFEC), trifluoropropylene carbonate (TFPC), ethylene carbonate (EC), vinyl carbonate (VC), and propylene carbonate (PC), 4-fluoromethyl-5-methyl-1,3-dioxolan-2-one (F-t-BC), 3,3-difluoropropylene carbonate (DFPC), 3,3,4,4,5,5,6,6,6-Non-afluorohexyl-1-ene carbonate, etc. Examples of the linear carbonate include ethyl methyl carbonate (EMC), dimethyl carbonate (DMC), and diethyl carbonate (DEC), and some partially or fully fluorinated ones.

In some implementations, the electrolyte can include more than one solvent. For example, the electrolyte may include two or more co-solvents. In some embodiments, at least one of the co-solvents in the electrolyte is a fluorine-containing compound, such as a fluorine-containing cyclic carbonate, a fluorine-containing linear carbonate, and/or a fluoroether. Examples of fluorine-containing compound may include FEC, DiFEC, TFPC, F-t-PC, DFPC, 1,1,2,2-tetrafluoroethyl 2,2,3,3-tetrafluoropropyl ether, 3,3,4,4,5,5,6,6,6-Nonafluorohexyl-1-ene carbonate, and other partially or fully fluorinated linear carbonates, partially or fully fluorinated cyclic carbonates, and partially or fully fluorinated ethers, etc. In some embodiments, the electrolyte contains FEC. In some embodiments, the electrolyte contains both EMC and FEC. In some embodiments, the electrolyte is free or substantially free of non-fluorine-containing cyclic carbonates, such as EC, VC, and PC. In some implementations, the electrolyte may further contain other co-solvent(s), such as methyl acetate (MA), ethyl acetate (EA), methyl propanoate, and gamma butyrolactone (GBL). The cyclic carbonates may be beneficial for SEI layer formations, while the linear carbonates may be helpful for dissolving Li-containing salt and for Li-ion transport.

An additional component in the electrolyte may be an additive or a co-solvent. As used herein, an additive of the electrolyte refers to a component that makes up less than 10% by weight (wt %) of the electrolyte. In some embodiments, the amount of each additive in the electrolyte may be from about 0.2 wt % to about 1 wt %, 0.1 wt % to about 2 wt %, 0.2 wt % to about 9 wt %, from about 0.5 wt % to about 9 wt %, from about 1 wt % to about 9 wt %, from about 1 wt % to about 8 wt %, from about 1 wt % to about 8 wt %, from about 1 wt % to about 7 wt %, from about 1 wt % to about 6 wt %, from about 1 wt % to about 5 wt %, from about 2 wt % to about 5 wt %, or any value in between. For example, the total amount of the additive(s) may be from about 1 wt % to about 9 wt %, from about 1 wt % to about 8 wt %, from about 1 wt % to about 7 wt %, from about 2 wt % to about 7 wt %, or any value in between.

As used herein, a co-solvent of an electrolyte has a concentration of at least about 10% by weight (wt %). In some embodiments, a co-solvent of the electrolyte may be about 20%, about 40%, about 60%, or about 80%, or about 90% by weight of the electrolyte. In some embodiments, a co-solvent may have a concentration from about 10% to about 90%, from about 10% to about 80%, from about 10% to about 60%, from about 20% to about 60%, from about 20% to about 50%, from about 30% to about 60%, or from about 30% to about 50% by weight.

Polymer Blending Technique

Directly blending different types of polymers is convenient, efficient, low-cost and easy to achieve. For example, the crystallinity of PEO can be reduced by hydrogen bonds between the bended polymers. This can help improve ionic conductivity. These blended polymers could reinforce the PEO phase, further improve the mechanical strength and dimensional thermostability. Thus, blending is an effective method to improve the ionic conductivities and mechanical strength of PEO-based membrane.

The electrochemical performances and safety of Si anode-based Li-ion batteries can be improved through the use of different types of polymer composite solid-state polymer electrolytes in addition to an amount of liquid electrolyte, used in quasi-solid-state cells and polymer gel electrolyte-based cells. Due to the special composition of the polymer composite and the corresponding synergistic effect among the different components, these polymer composite based quasi-solid-state polymer electrolytes or polymer gel electrolytes may possess decent Li+-ion conductivity, greater electrochemical stability voltage window, enhanced thermal stability/mechanical properties, and diminished flammability. These can help increase both Li-ion battery lifetime and safety. In addition, the enhanced stability and safety of polymer composite-based quasi-solid-state or gel electrolytes can also help simplify and redesign safety measures currently used in the Li-ion batteries.

In some embodiments, the storage device as described herein does not combust, leak, corrode, or cause internal shorting like the pure organic liquid ones. At the same time, their high fracture energy and elastic moduli, excellent compatibility with electrodes are also superior to their pure inorganic counterparts. In some embodiments, the storage device is more chemically stable or could be inert toward Si anode and/or high-voltage Ni-rich NMC or NCA cathodes.

In some embodiments, the membrane can play the role of separators at the same time. In some embodiments, the energy storage device has high thermal stability during charge and discharge, wide electrochemical stability window against irreversible reaction, good compatibility with the electrodes, enhanced Li transference number and high total Li+ ionic conductivity. In some embodiments, it is contemplated that the energy storage device described herein can provide significant advantages such as higher energy storage ability, ease of fabrication, and low cost.

In some embodiments, the second electrode is a Si-dominant electrode. In some embodiments, the second electrode is a high-energy-density high-loading anode that won't shatter the polymer composite solid electrolytes or polymer gel electrolytes by expanding too much. In is contemplated that conventional silicon particles expand between 100-300%, but the high-energy-density high-loading anode as described herein reduce expansion by creating a composite layer that strongly adheres to copper, which allows the anodes to swell only about 0-3%.

In some embodiments, the energy storage device shows the following benefits: (a) good thermal and mechanical properties, ease of thin film fabrication with desirable shapes and the ability of forming good electrode/electrolyte contact; (b) good ionic conductivity, enhanced dimensional and mechanical stabilities; (c) a broad electrochemical stability window; (d) the presence of uniformly distributed filler produced through in-situ chemical reaction in the polymer blend solutions.

In some embodiments, the presence of inorganic fillers, such as $SiO_2$, $Al_2O_3$, $TiO_2$, $Li_3N$ and Li-ion conductors can help improve the ionic conductivity of the electrolyte by modulating the Lewis acid-base interactions among the inorganic fillers. In some embodiments, the inorganic fillers are active fillers. In some embodiments, the inorganic fillers are inactive fillers.

In some embodiments, the energy storage device possesses high fluoroethylene carbonate (FEC) content in the standard liquid electrolytes. While conventional knowledge note that high FEC content is detrimental to cell performance, it has been found that using high FEC ($\geq$30 wt %) does not cause detriments to performance while helping the low-expansion Si anode cycle.

It was noted that the method and membrane possess good mechanical and thermal properties due to the existence of hydrogen bonding among PMVMA and PVA chains. The method and membrane also possess good Li+-ion conductivity due to the presence of PEO phase as well as the loaded SiO2 filler. The method and membrane also possess uniform distribution of SiO2 filler among trinary polymer blend-based membrane, because SiO2 was formed through the hydrolyzing reaction between the —COOH group in PMVMA and TEOS.

EXAMPLES

The below example devices and processes for device fabrication generally described below, and the performances of Li-ion batteries with different polymer electrolytes and fillers are evaluated.

Example 1

In Example 1, a PEO/PMVMA/PVA trinary polymer blend-based membrane loaded with $SiO_2$ and LiTFSI is prepared. FIG. 1 illustrates the prepared PEO/PMVMA/PVA blend-based membrane loaded with $SiO_2$ and LiTFSI. The membrane was used as solid electrolyte or polymer gel electrolyte for Si-dominant anode//Ni-rich NMC or NCA cathode quasi-solid cell with a solid separator through adding some standard liquid electrolyte at the same time. The film is thin and clean because no other impurity was involved in the membrane preparation process.

For this synthesis, 2 grams of PEO, 1 gram of PMVMA, and 1 gram of PVA were mixed with 76 grams of deionized water. The reaction mixture was slowly heated to 80° C. under vigorous stirring and kept at this temperature for 8 hours. The solution was then continuously stirred for 12 hours. 300 mg of LiTFSI was then added under constant stirring. After another 12 hours, 1.05 grams of TEOS in 4 grams of ethanol was added under constant stirring. The temperature was increased to 80° C. and kept at this temperature for another 12 hours. The pH value is about 3. The as-prepared polymer solution as used to prepare a smooth polymer composite membrane using a doctor blade. The as-fabricated membrane was dried at room temperature for 24 hours, then dried at 60° C. in a vacuum oven for another 48 hours. This membrane (with polymer electrolyte, quasi-solid-state electrolyte or gel electrlolyte), as shown in FIG. 1, was used for Si dominant anode//Ni-rich NMC or NCA cathode cells with standard electrolyte added to the cell to both fill the pores within the anode and cathode as well as to partially absorb into the membrane. The film possesses good mechanical properties.

Example 2

In Example 2, the charge and discharge capacity as well as the capacity retention and normalized capacity retention of PEO/PMVMA/PVA/$SiO_2$/LiTFSI composite membrane-based solid-state electrolyte or gel electrolyte plus 100 μl liquid electrolyte with the formulation of 0.45 M LiTFSI in fluoroethylene carbonate (FEC)/ethylmethyl carbonate (EMC) (3/7 wt %) in a Si-dominant anode/NMC cathode full cell was examined.

Figure 2A:
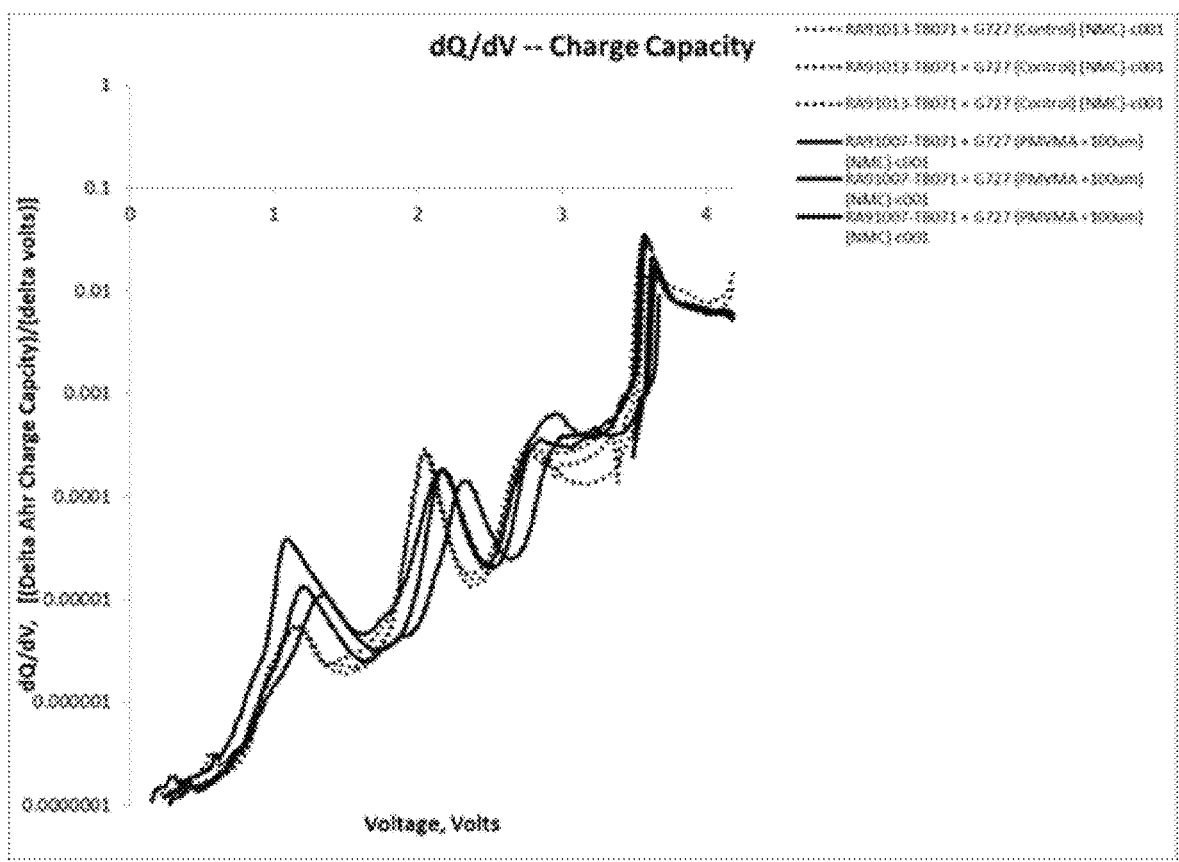
FIGS. 2A and 2B show the dQ/dV curves during Charge (A) and Discharge (B) of an embodiment of Si-dominant anode//NMC cathode full cells, respectively.
Figure 2B:
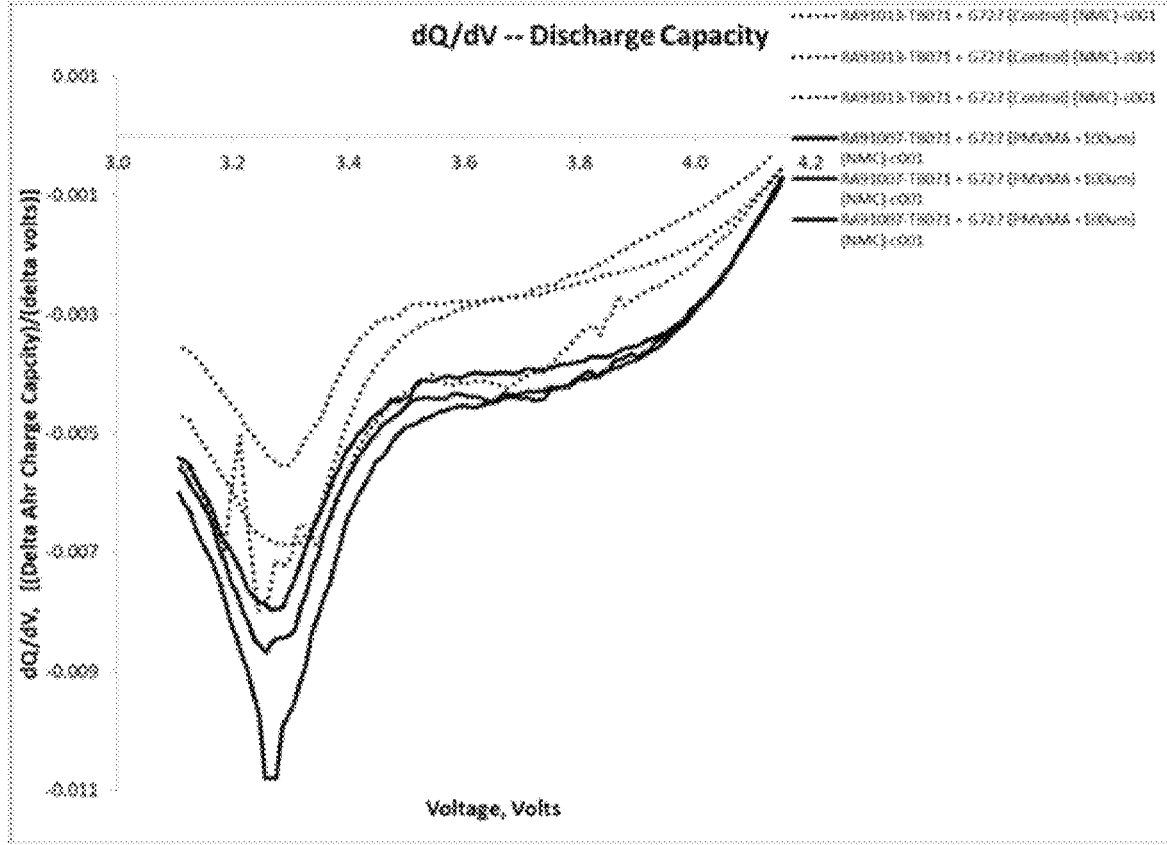

FIGS. 2A and 2B show the dQ/dV curves during Charge (A) and Discharge (B) of Si-dominant anode//NMC cathode full cells, respectively. The dotted lines illustrate the charge and discharge capacity of 0.45 M LiTFSI in FEC/EMC (3/7 wt %) while the solid lines illustrate the charge and discharge capacity of PEO/PMVMA/PVA/$SiO_2$/LiTFSI composite membrane-based solid-state electrolyte or gel electrolyte plus 100 μl liquid electrolyte with the formulation of 0.45 M LiTFSI in FEC/EMC (3/7 wt %). The first formation cycle dQ/dV curves in FIGS. 2A and 2B show that the fundamental electrochemistry of lithiation and delithiation is not affected by making a quasi-solid cell with the as-fabricated polymer solid electrolyte or polymer gel electrolyte.

The Si-dominant anodes contain about 80 wt % Si, 5 wt % graphite and 15 wt % glassy carbon (from resin) and are laminated on 15 μm Cu foil. The average loading is about 3.8 mg/cm². The cathodes contain about 92 wt % NMC, 4 wt % Super P and 4 wt % PVDF5130, and are coated on 15 μm Al foil. The average loading is about 23 mg/cm². The dQ/dV data were obtained through the following testing protocol: Charge at 0.05C to 4.2 V until 0.05C, rest 5 minutes, discharge at 0.05C to 3.1 V, rest 5 minutes.

Figure 3A:
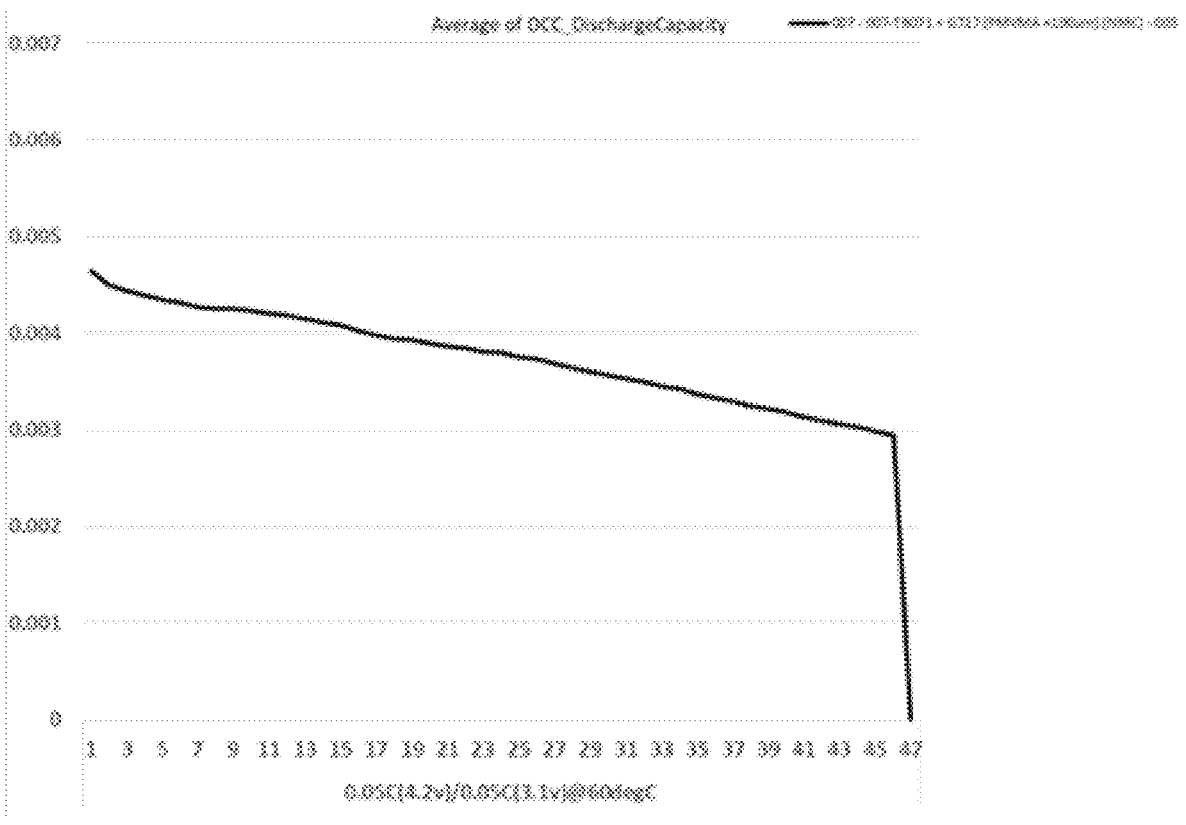
FIGS. 3A and 3B show capacity retention (A) and normalized capacity retention (B) of an embodiment of Si-dominant anode//NMC cathode full cells, respectively.
Figure 3B:
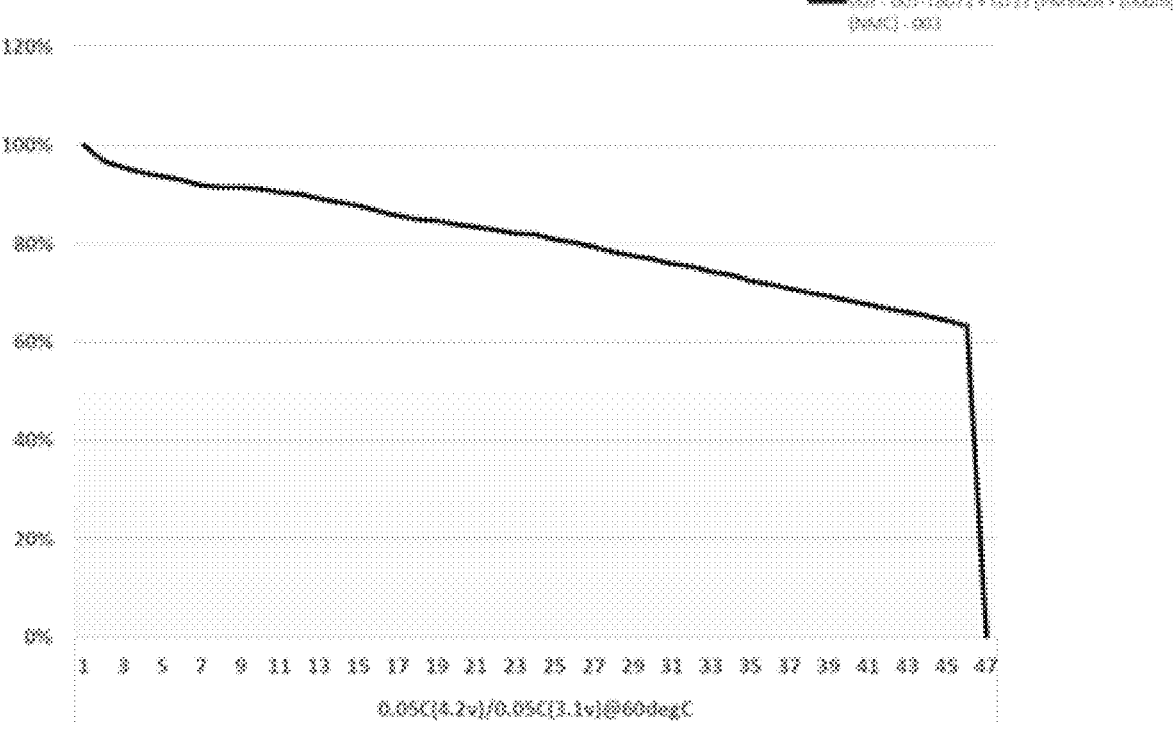

FIGS. 3A and 3B show capacity retention (A) and normalized capacity retention (B) of Si-dominant anode//NMC cathode full cells, respectively. As noted above, the electrolyte used was PEO/PMVMA/PVA/SiO₂/LiTFSI membrane-based solid-state electrolyte or polymer gel electrolyte plus 1000 liquid electrolyte with the formulation of 0.45 M LiTFSI in FEC/EMC (3/7 wt %). The average thickness of PEO/PMVMA/PVA/SiO₂/LiTFSI membrane is about 60 μm. The long-term cycling include: Charge at 0.05C to 4.2 V until 0.05C, rest 5 minutes, discharge at 0.05C to 3.1 V, rest 5 minutes. FIGS. 3A and 3B illustrate that the Si-dominant anode/NMC cathode quasi-solid cell with as-fabricated polymer solid electrolyte or polymer gel electrolyte have relatively stable cycle performance even after about 40 cycles. Note that the lower capacity at the final cycle does not indicate failure but indicates that the test is still on-going.

Example 3

In Example 3, the charge and discharge capacity as well as the capacity retention and normalized capacity retention of PEO/PMVMA/PVA/SiO₂/LiTFSI composite membrane-based solid-state electrolyte or gel electrolyte plus 100 μl liquid electrolyte with the formulation of 0.45 M LiTFSI in FEC/EMC (3/7 wt %) in a Si-dominant anode/NCA cathode full cell was examined.

Figure 4A:
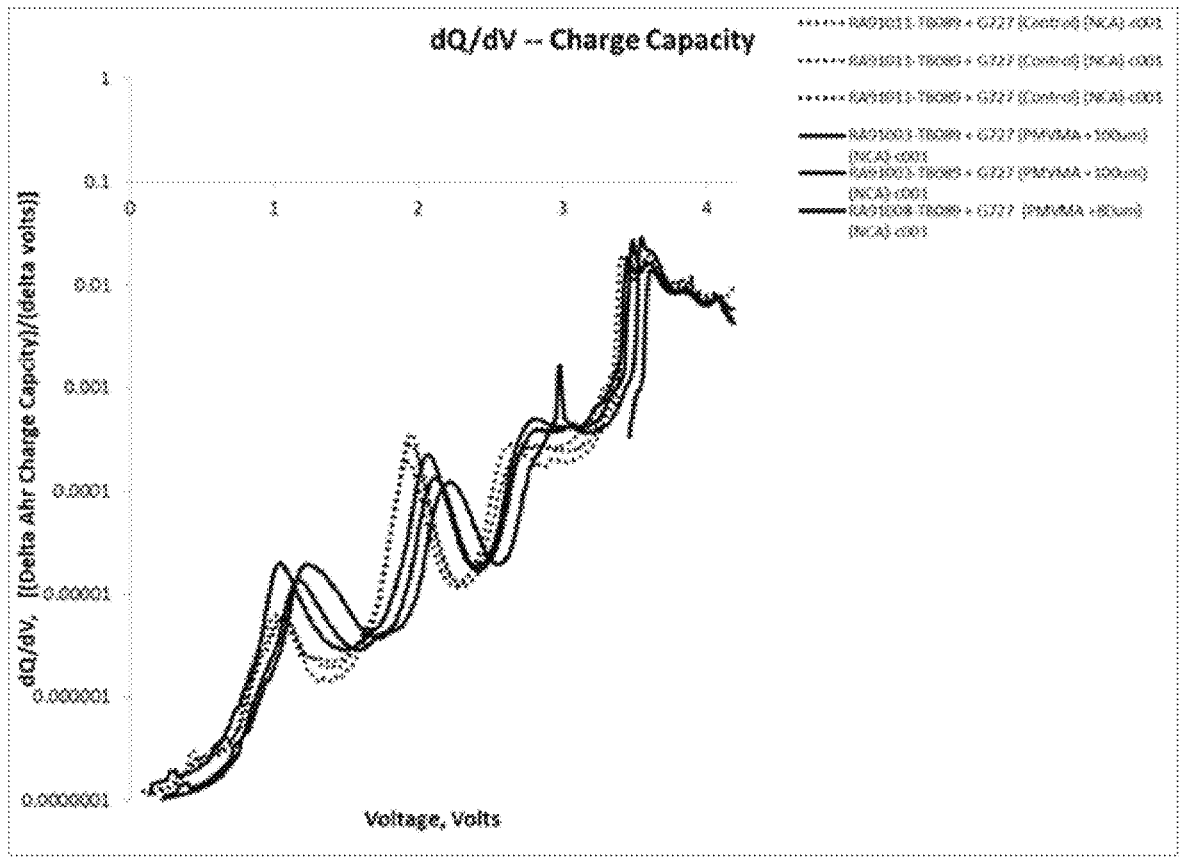
FIGS. 4A and 4B show the dQ/dV curves during Charge (A) and Discharge (B) of an embodiment of Si-dominant anode/NCA cathode full cells, respectively.
Figure 4B:
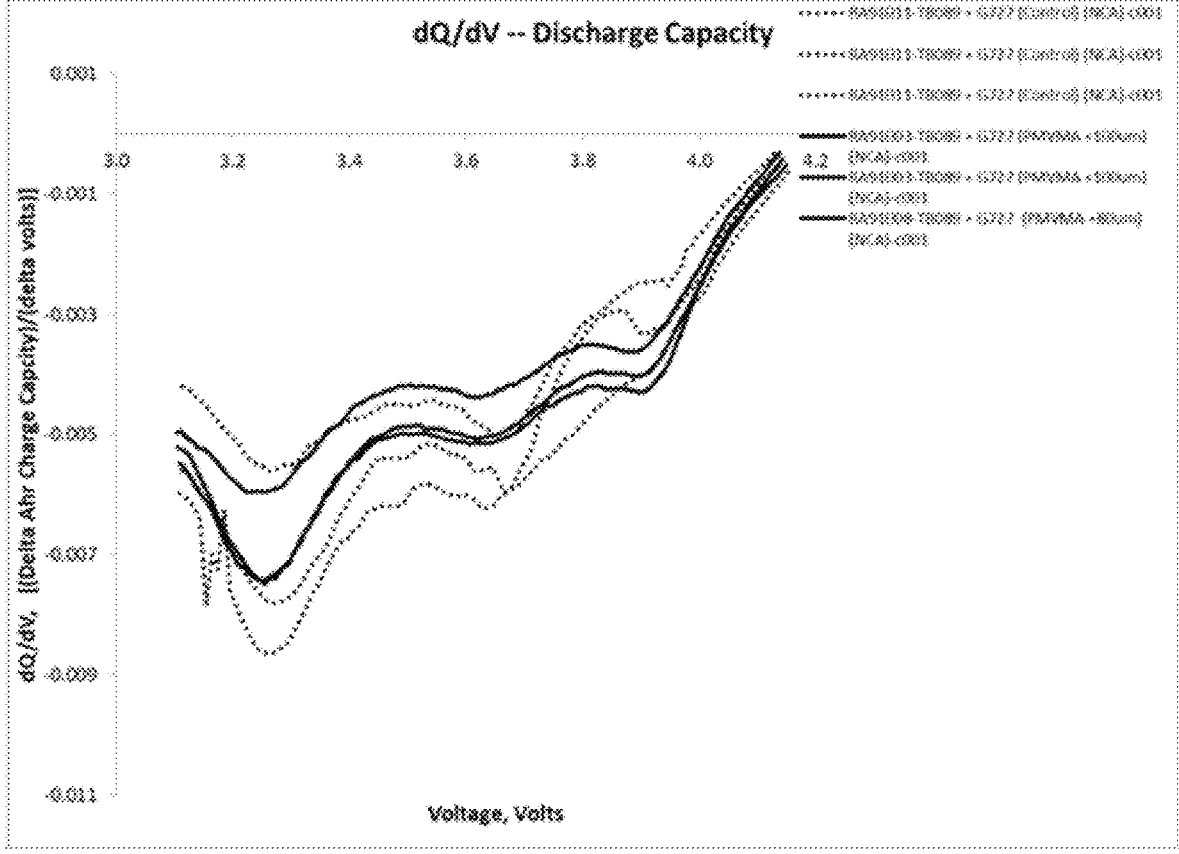

FIGS. 4A and 4B show the dQ/dV curves during Charge (A) and Discharge (B) of Si-dominant anode//NCA cathode full cells, respectively. The dotted lines illustrate the charge and discharge capacity of 0.45 M LiTFSI in FEC/EMC (3/7 wt %) while the solid lines illustrate the charge and discharge capacity of PEO/PMVMA/PVA/SiO₂/LiTFSI composite membrane-based solid-state electrolyte or gel electrolyte plus 100 μl liquid electrolyte with the formulation of 0.45 M LiTFSI in FEC/EMC (3/7 wt %). The first formation cycle dQ/dV curves in FIGS. 4A and 4B show that the fundamental electrochemistry of lithiation and delithiation is not affected by making a quasi-solid cell with the as-fabricated polymer solid electrolyte or polymer gel electrolyte.

The average thickness of PEO/PMVMA/PVA/SiO₂/LiTFSI membrane is about 60 μm. The average loading is about 3.8 mg/cm². The cathodes contain about 92 wt % NCA, 4 wt % Super P and 4 wt % PVDF5130, and are coated on 15 μm Al foil. The average loading is about 23 mg/cm². The dQ/dV data were obtained through the following same testing protocol as shown in FIGS. 2A and 2B.

Figure 5A:
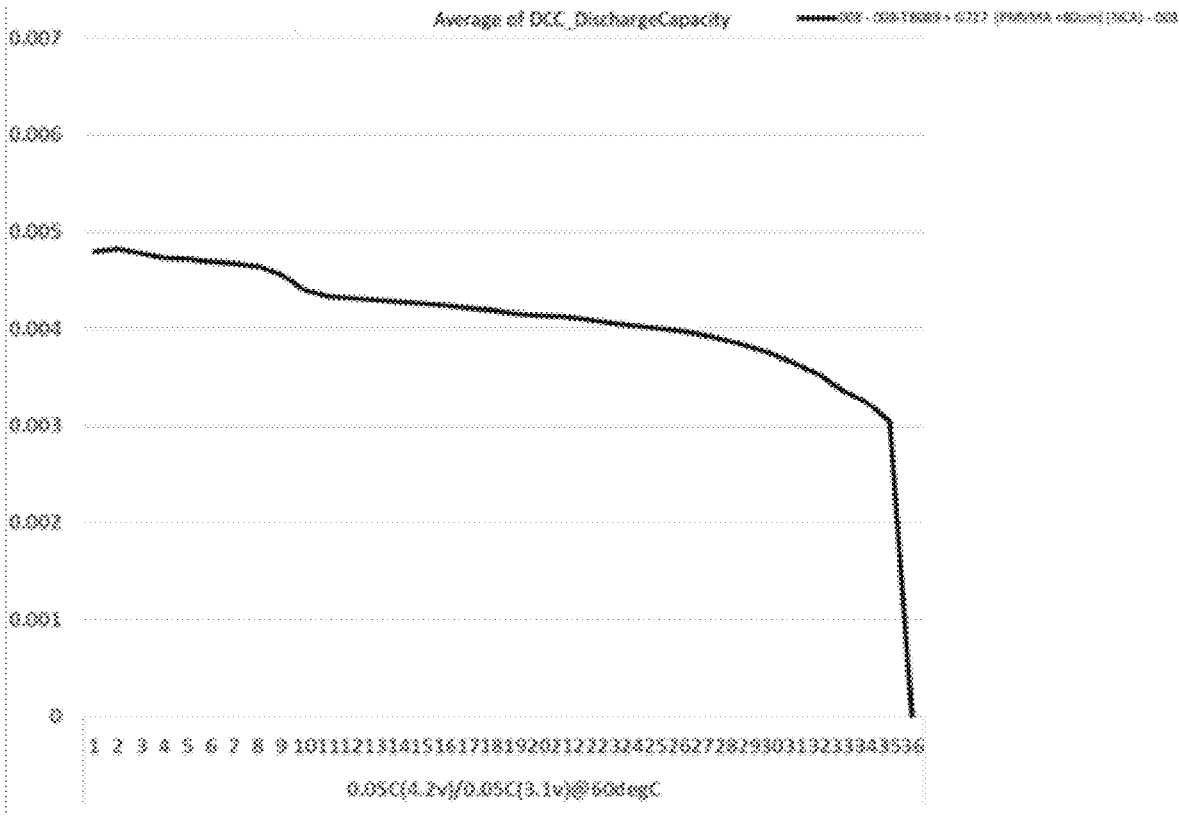
FIGS. 5A and 5B show capacity retention (A) and normalized capacity retention (B) of an embodiment of Si-dominant anode//NCA cathode full cells, respectively.
Figure 5B:
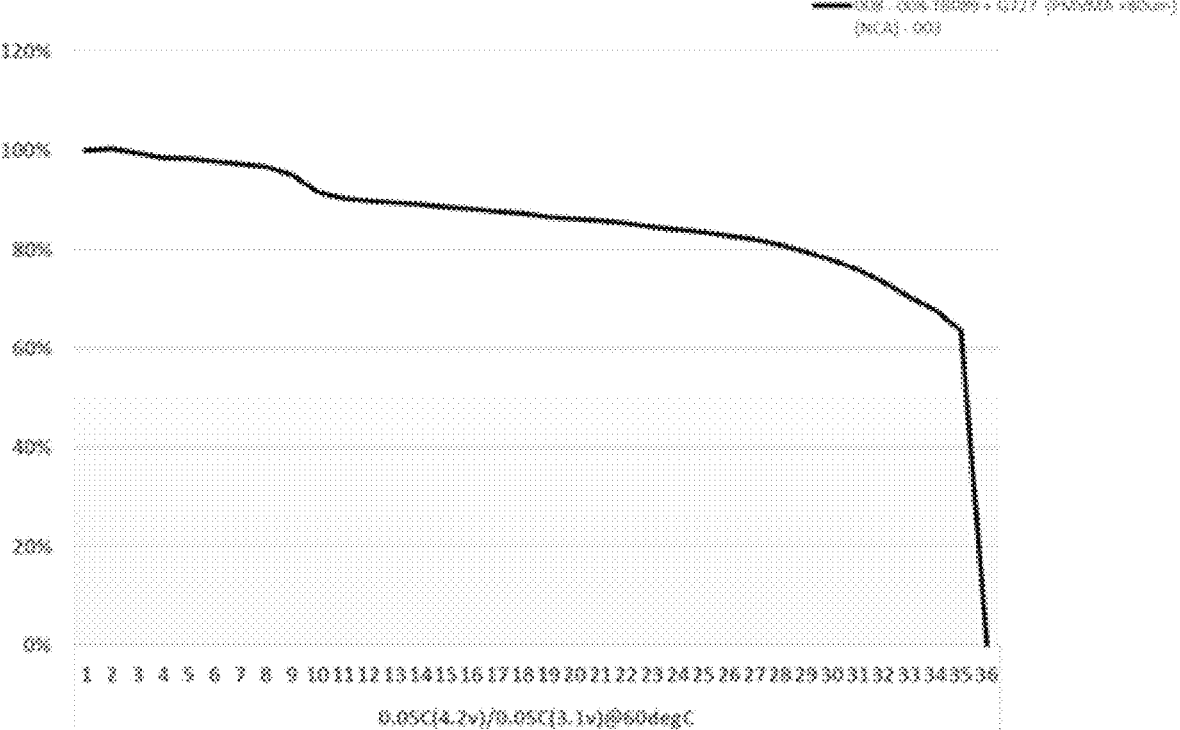

FIGS. 5A and 5B show capacity retention (A) and normalized capacity retention (B) of Si-dominant anode//NCA cathode full cells, respectively. As noted above, the electrolyte used was PEO/PMVMA/PVA/SiO₂/LiTFSI membrane-based solid-state electrolyte or polymer gel electrolyte plus 100 μl liquid electrolyte with the formulation of 0.45 M LiTFSI in FEC/EMC (3/7 wt %). The long-term cycling programs are the same with the above mentioned in FIGS. 3A and 3B. FIGS. 5A and 5B illustrate that the Si-dominant anode/NCA cathode quasi-solid cell with as-fabricated polymer solid electrolyte or polymer gel electrolyte have relatively stable cycle performance even after about 30 cycles. Note that the lower capacity at the final cycle does not indicate failure but indicates that the test is still on-going.

Example 4

In Example 4, the charge and discharge capacity as well as the capacity retention and normalized capacity retention of PEO/PMVMA/PVA/SiO₂/LiTFSI composite membrane-based solid-state electrolyte or gel electrolyte plus 100 μl standard electrolyte with the formulation of 1.2M LiPF₆ in FEC/EMC (3/7 wt %) in a Si-dominant anode/NMC cathode full cell was examined.

Figure 6A:
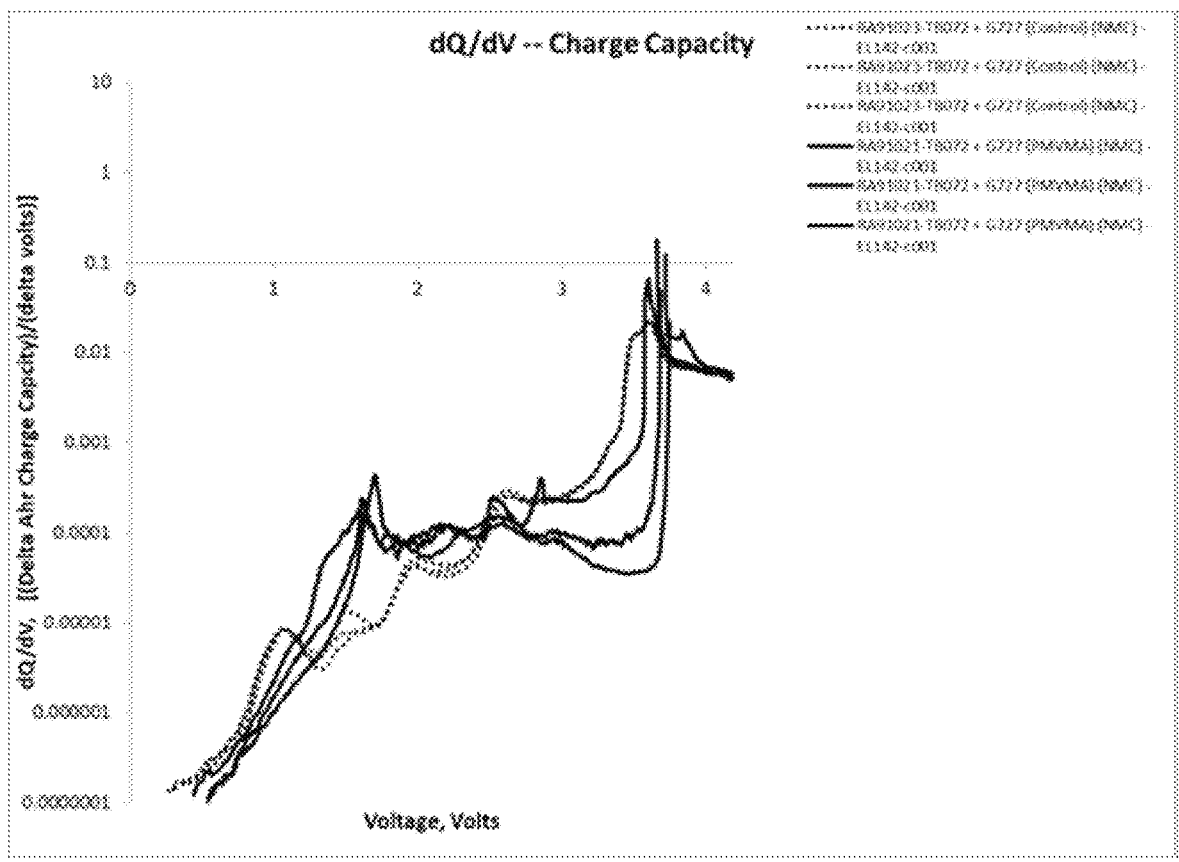
FIGS. 6A and 6B show the dQ/dV curves during Charge (A) and Discharge (B) of an embodiment of Si-dominant anode//NMC cathode full cells, respectively.
Figure 6B:
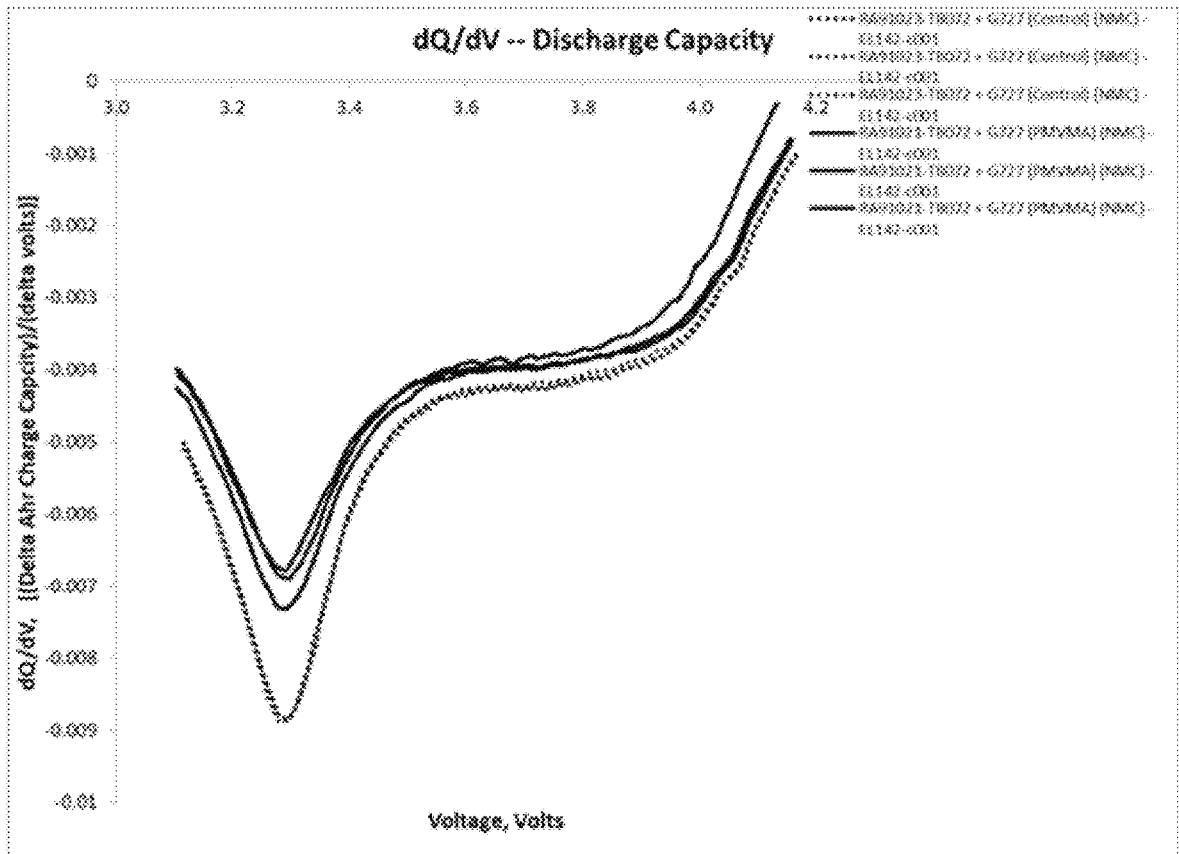

FIGS. 6A and 6B show the dQ/dV curves during Charge (A) and Discharge (B) of Si-dominant anode//NMC cathode full cells, respectively. The dotted lines illustrate the charge and discharge capacity of 1.2M LiPF₆ in FEC/EMC (3/7 wt %) while the solid lines illustrate the charge and discharge capacity of PEO/PMVMA/PVA/SiO₂/LiTFSI composite membrane-based solid-state electrolyte or gel electrolyte plus 100 μl standard electrolyte with the formulation of 1.2M LiPF₆ in FEC/EMC (3/7 wt %). The first formation cycle dQ/dV curves in FIGS. 6A and 6B show that the fundamental electrochemistry of lithiation and delithiation is not affected by making a quasi-solid cell with the as-fabricated polymer solid electrolyte or polymer gel electrolyte.

The average thickness of PEO/PMVMA/PVA/SiO₂/LiTFSI membrane is about 60 μm. The average loading is about 3.8 mg/cm². The cathodes contain about 92 wt % NMC, 4 wt % Super P and 4 wt % PVDF5130, and are coated on 15 μm Al foil. The average loading is about 23 mg/cm². The dQ/dV data were obtained through the following same testing protocol as shown in FIGS. 2A and 2B.

Figure 7A:
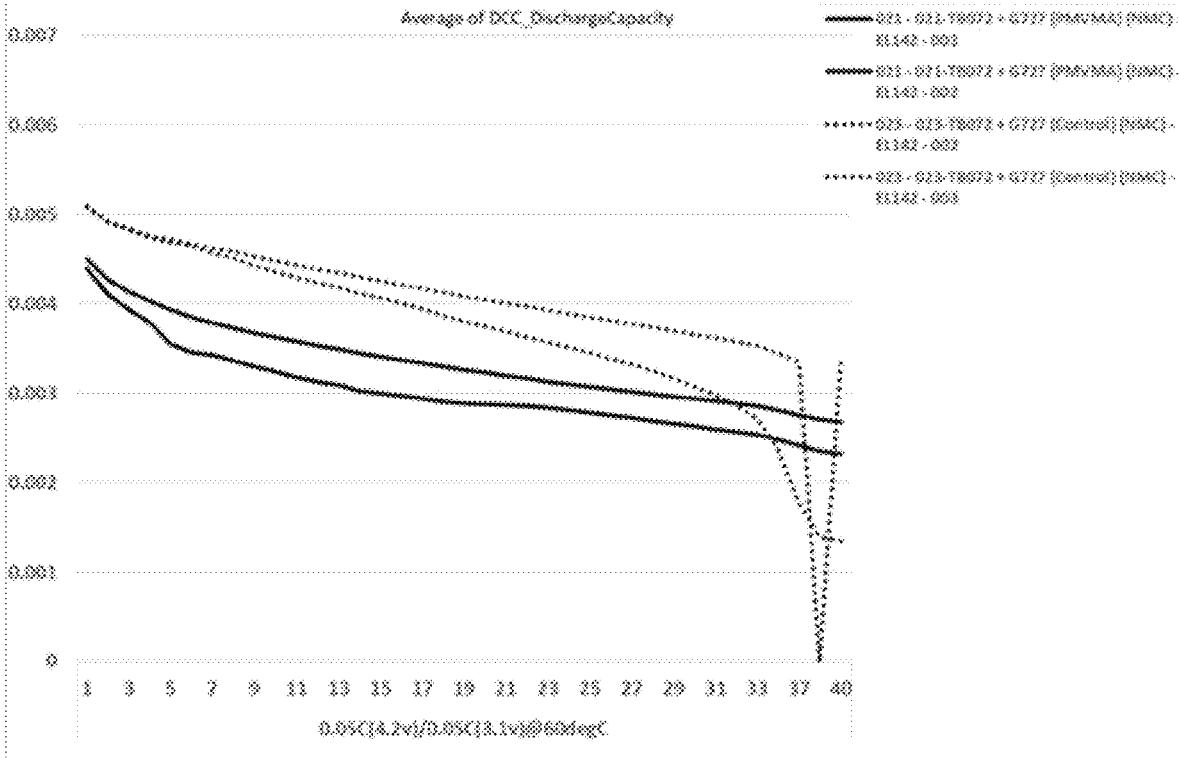
FIGS. 7A and 7B show capacity retention (A) and normalized capacity retention (B) of an embodiment of Si-dominant anode//NMC cathode full cells, respectively.
Figure 7B:
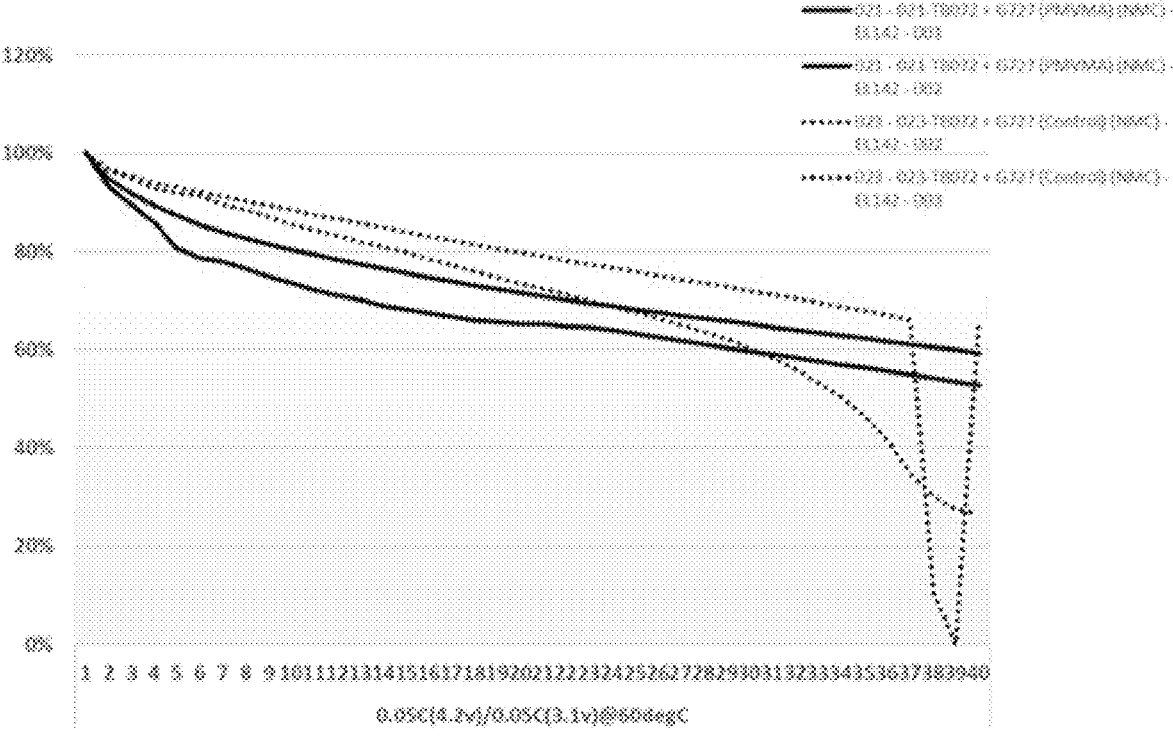

FIGS. 7A and 7B show capacity retention (A) and normalized capacity retention (B) of Si-dominant anode//NMC cathode full cells, respectively. As noted above, the electrolyte used was PEO/PMVMA/PVA/SiO₂/LiTFSI membrane-based solid-state electrolyte or polymer gel electrolyte plus 100 μl standard electrolyte with the formulation of 1.2M LiPF₆ in FEC/EMC (3/7 wt %). The long-term cycling programs are the same with the above mentioned in FIGS. 3A and 3B. FIGS. 7A and 7B illustrate that the Si-dominant anode/NMC cathode quasi-solid cell with as-fabricated polymer solid electrolyte or polymer gel electrolyte have relatively stable cycle performance even after about 40 cycles. Note that the lower capacity at the final cycle does not indicate failure but indicates that the test is still on-going.

Example 5

In Example 5, the charge and discharge capacity as well as the capacity retention and normalized capacity retention of PEO/PMVMA/PVA/SiO₂/LiTFSI composite membrane-based solid-state electrolyte or gel electrolyte plus 100 μl standard electrolyte with the formulation of 1.2M LiPF₆ in FEC/EMC (3/7 wt %) in a Si-dominant anode/NCA cathode full cell was examined.

Figure 8A:
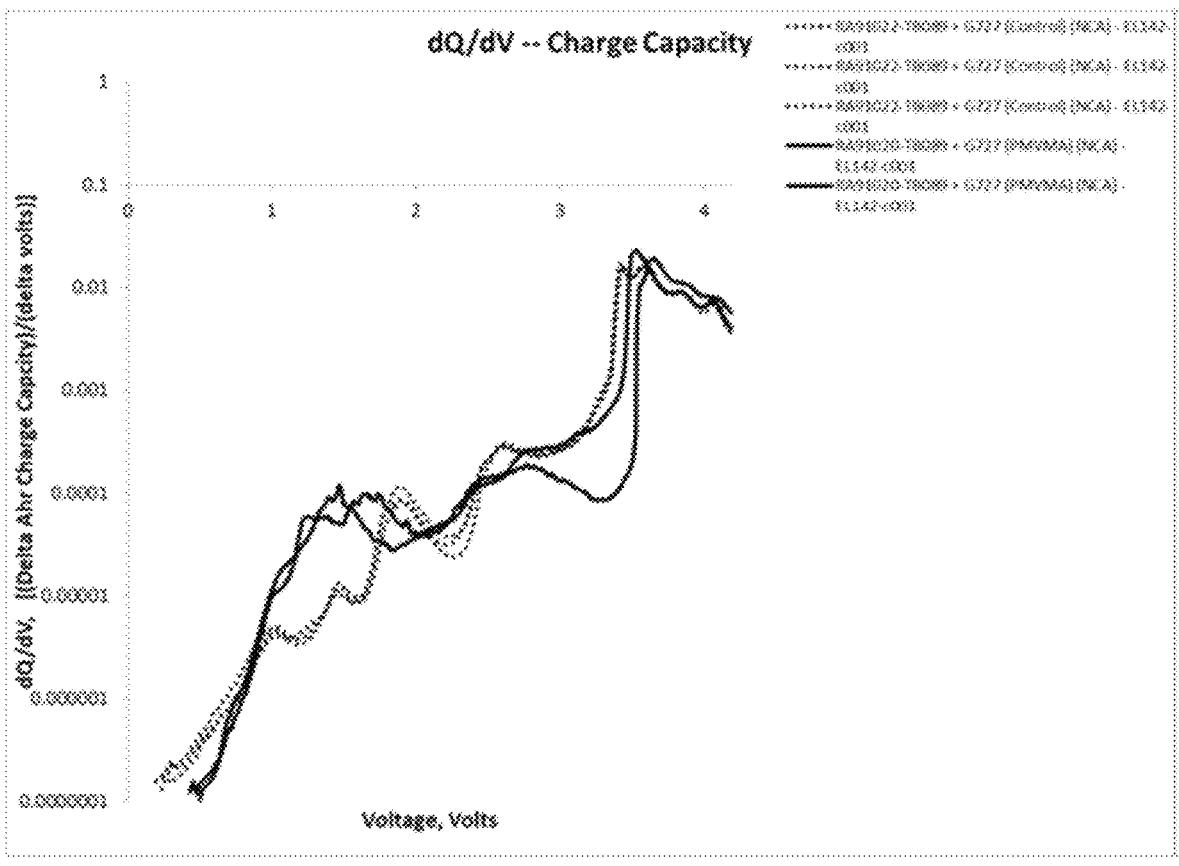
FIGS. 8A and 8B show the dQ/dV curves during Charge (A) and Discharge (B) of an embodiment of Si-dominant anode//NCA cathode full cells, respectively.
Figure 8B:
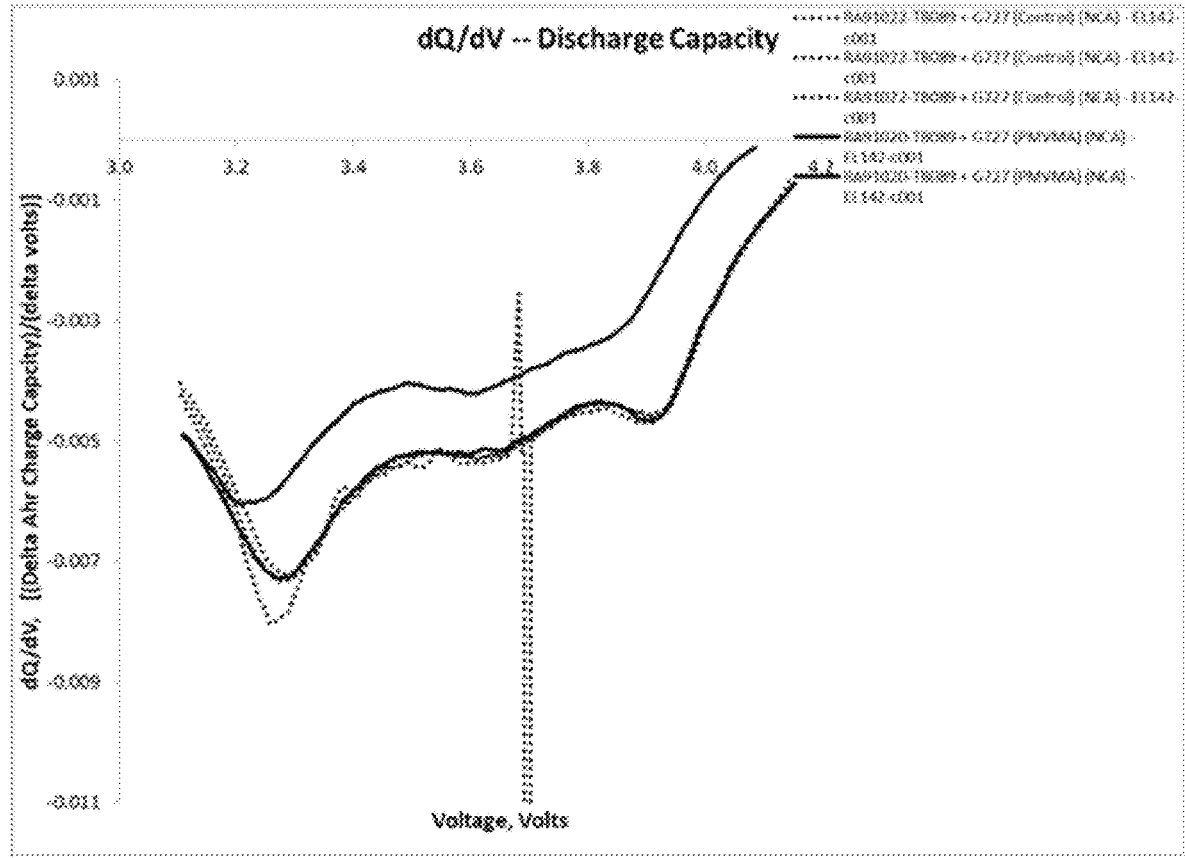

FIGS. 8A and 8B show the dQ/dV curves during Charge (A) and Discharge (B) of Si-dominant anode//NCA cathode full cells, respectively. The dotted lines illustrate the charge and discharge capacity of 1.2M $LiPF_6$ in FEC/EMA (3/7 wt %) while the solid lines illustrate the charge and discharge capacity of $PEO/PMVMA/PVA/SiO_2/LiTFSI$ composite membrane-based solid-state electrolyte or gel electrolyte plus 100 µl standard electrolyte with the formulation of 1.2M $LiPF_6$ in FEC/EMC (3/7 wt %). The first formation cycle dQ/dV curves in FIGS. 6A and 6B show that the fundamental electrochemistry of lithiation and delithiation is not affected by making a quasi-solid cell with the as-fabricated polymer solid electrolyte or polymer gel electrolyte.

The average thickness of $PEO/PMVMA/PVA/SiO_2/LiTFSI$ membrane is about 60 µm. The average loading is about 3.8 mg/cm². The cathodes contain about 92 wt % NCA, 4 wt % Super P and 4 wt % PVDF5130, and are coated on 15 µm Al foil. The average loading is about 23 mg/cm². The dQ/dV data were obtained through the following same testing protocol as shown in FIGS. 2A and 2B.

Figure 9A:
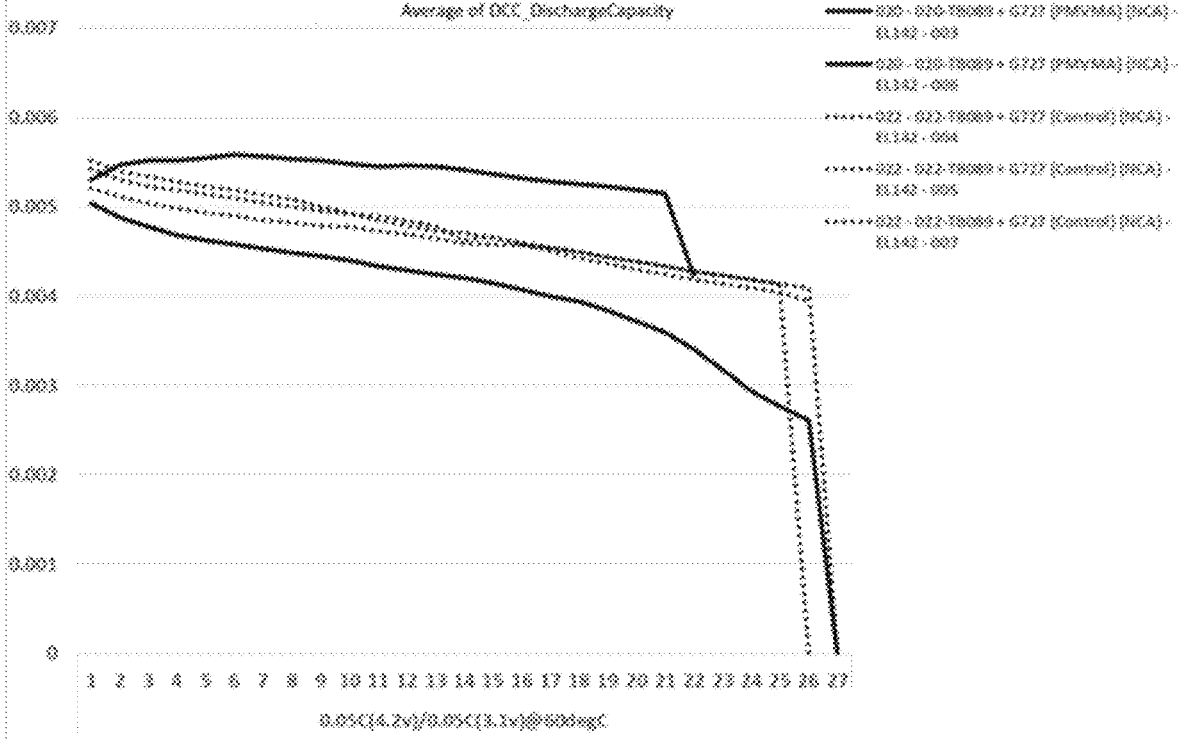
FIGS. 9A and 9B show capacity retention (A) and normalized capacity retention (B) of an embodiment of Si-dominant anode//NCA cathode full cells, respectively.
Figure 9B:
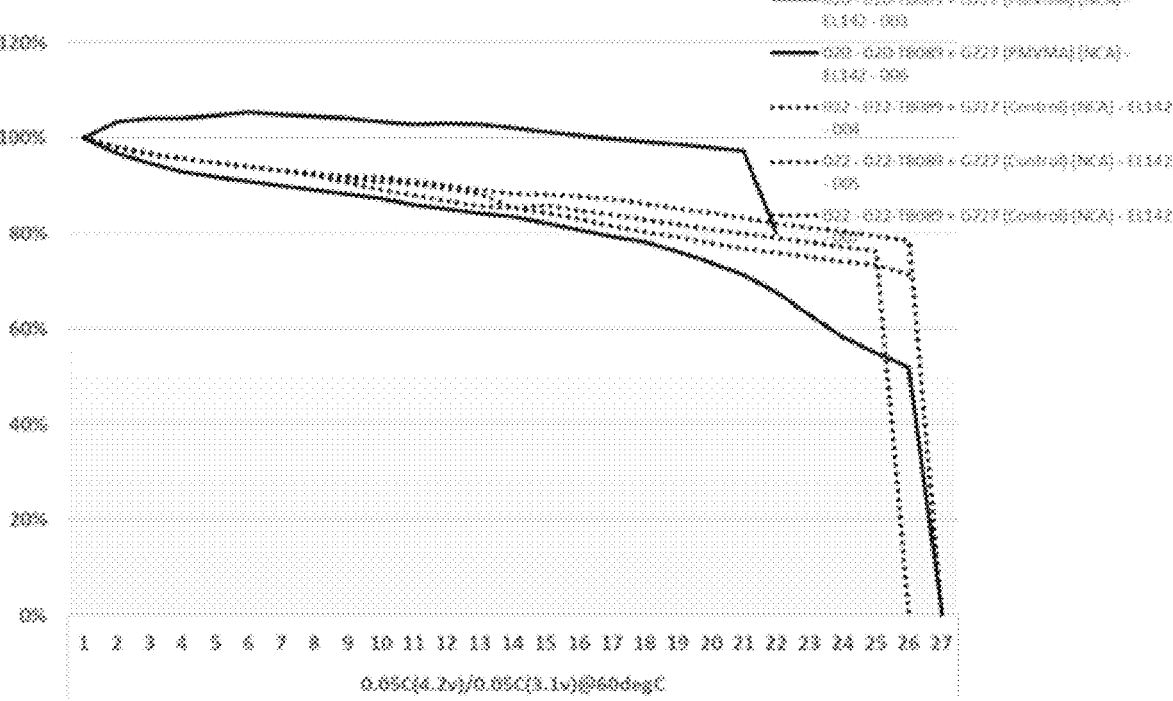

FIGS. 9A and 9B show capacity retention (A) and normalized capacity retention (B) of Si-dominant anode//NMC cathode full cells, respectively. As noted above, the electrolyte used was $PEO/PMVMA/PVA/SiO_2/LiTFSI$ membrane-based solid-state electrolyte or polymer gel electrolyte plus 100 µl standard electrolyte with the formulation of 1.2M $LiPF_6$ in FEC/EMC (3/7 wt %). The long-term cycling programs are the same with the above mentioned in FIGS. 3A and 3B. FIGS. 9A and 9B illustrate that the Si-dominant anode/NCA cathode quasi-solid cell with as-fabricated polymer solid electrolyte or polymer gel electrolyte have relatively stable cycle performance even after about 20 cycles. Note that the lower capacity at the final cycle does not indicate failure but indicates that the test is still on-going.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. An energy storage device comprising:
a first electrode;
a second electrode, wherein the second electrode is a Si-dominant anode having greater than 50% silicon; and
a blend-based membrane between the first electrode and the second electrode, wherein the blend-based membrane comprises two or more polymer electrolytes;
lithium bis(trifluoromethanesulfonyl)imide (LiTFSI); and
at least one filler; and further wherein the blend-based membrane is selected from the group consisting of:
PEO/PMVMA/cyclodextrin (CD), PEO/PMVMA/polyacrylamide (PAM), PEO/PMVMA/polysaccharide-based biopolymer, PEO/PMVMA/polyurethane (PU), PEO/PMVMA/R—OH, PEO/PAA/CD, PEO/PAA/PAM, PEO/PAA/polysaccharide-based biopolymer, PEO/PAA/R—OH, PEO/Alginate/PVA, PEO/Alginate/CD, PEO/Alginate/PAM, PEO/Alginate/polysaccharide-based biopolymer, PEO/Alginate/PU, PEO/Alginate/R—OH, PEO/R—COOH/R'—OH, poly(vinylidene fluoride-co-hexafluoropropylene) (PVDF-HFP)/PMVMA/PVA, PVDF-HFP/PMVMA/CD, PVDF-HFP/PMVMA/PAM, PVDF-HFP/PMVMA/polysaccharide-based biopolymer, PVDF-HFP/PMVMA/PU, PVDF-HFP/PMVMA/R—OH, PVDF-HFP/PAA/PVA, PVDF-HFP/PAA/CD, PVDF-HFP/PAA/PAM, PVDF-HFP/PAA/polysaccharide-based biopolymer, PVDF-HFP/PAA/R—OH, PVDF-HFP/Alginate/PVA, PVDF-HFP/Alginate/CD, PVDF-HFP/Alginate/PAM, PVDF-HFP/Alginate/polysaccharide-based biopolymer, PVDF-HFP/Alginate/PU, PVDF-HFP/Alginate/R—OH, PVDF-HFP/R—COOH/R'—OH, polyacrlonitrle (PAN)/PMVMA/PVA, PAN/PMVMA/CD, PAN/PMVMA/PAM, PAN/PMVMA/polysaccharide-based biopolymer, PAN/PMVMA/PU, PAN/PMVMA/R—OH, PAN/PAA/PVA, PAN/PAA/CD, PAN/PAA/PAM, PAN/PAA/polysaccharide-based biopolymer, PAN/PAA/R—OH, PAN/Alginate/PVA, PAN/Alginate/CD, PAN/Alginate/PAM, PAN/Alginate/polysaccharide-based biopolymer, PAN/Alginate/PU, PAN/Alginate/R—OH, PAN/R—COOH/R'—OH, poly(methyl methacrylate) (PMMA)/PMVMA/PVA, PMMA/PMVMA/CD, PMMA/PMVMA/PAM, PMMA/PMVMA/polysaccharide-based biopolymer, PMMA/PMVMA/PU, PMMA/PMVMA/R—OH, PMMA/PAA/PVA, PMMA/PAA/CD, PMMA/PAA/PAM, PMMA/PAA/polysaccharide-based biopolymer, PMMA/PAA/R—OH, PMMA/Alginate/PVA, PMMA/Alginate/CD, PMMA/Alginate/PAM, PMMA/Alginate/polysaccharide-based biopolymer, PMMA/Alginate/PU, PMMA/Alginate/R—OH, and PMMA/R—COOH/R'—OH;
wherein said first electrode is a cathode selected from the group consisting of: a Ni-rich $Li[Ni_xCo_yMn(Al)_{1-x-y}]O_2$ cathode; a Ni-rich lithium nickel cobalt manganese oxide $LiNiCoMnO_2$ (NMC) cathode, a Ni-rich lithium nickel cobalt aluminum oxide $LiNiCoAlO_2$ (NCA) cathode, a $LiCoO_2$ cathode, a lithium rich, $xLi_2Mn_3 \cdot (1-x)$ $LiNi_aCo_bMn_cO_2$ cathode, a nickel-rich layered cobalt oxide $(LiNi_{1-x}Co_xO_2)$ cathode, a nickel-rich layered manganese oxide $(LiNi_{1-x}Mn_xO_2)$ cathode, a nickel-rich layered aluminum oxide $(LiNi_{1-x}Al_xO_2)$ cathode, a lithium rich layered cobalt oxide $(LiNi_{1+x}Co_{1-x}O_2)$ cathode, a lithium rich layered manganese oxide $(LiNi_{1+x}Mn_{1-x}O_2)$ cathode, a lithium rich layered nickel oxide $(LiNi_2O_2)$ cathode, a high-voltage spinel oxide $(LiNi_{0.5}Mn_{1.5}O_4)$ cathode, a high-voltage phosphate cathode, a high-voltage sulfate cathode, and a high-voltage silicate cathode; and
wherein the silicon in the second electrode is present as silicon particles.

2. The energy storage device of claim 1, wherein the two or more polymer electrolytes comprise a quasi-solid-state electrolyte or a polymer gel.

3. The energy storage device of claim 1, wherein the at least one filler is an active filler.

4. The energy storage device of claim 1, wherein the at least one filler is an inactive filler.

5. The energy storage device of claim 1, wherein the second electrode is a Si-dominant anode.

6. The energy storage device of claim 1, wherein the energy storage device has a total capacity of equal to or above 10 mAh/cm².

7. The energy storage device of claim 1, wherein the energy storage device has a cycled capacity of equal to or above 4 mAh/cm² for each electrode.

8. The energy storage device of claim 3, wherein said active filler is an active ceramic particle.

9. The energy storage device of claim 8, wherein said active ceramic particle is selected from the group consisting of: LISICON-type ceramics, sodium superionic conductors (NASICONs)-type ceramics, garnet-like structural ceramics, oxide based perovskite-type ceramics, sulfide based glassy and glass-ceramics, thio-LiSICONS ceramics, LiPON-based ceramic, Li argyrodite, $Li_3PO_4$, $Li_3N$, Li halide, and Li hydride.

10. The energy storage device of claim 4, wherein said inactive filler is selected from the group consisting of: $SiO_2$, $Al_2O_3$, $TiO_2$, $Li_3N$, NiO, CuO, $CeO_2$, $Sm_2O_3$, Li-ion conductor, metal oxides, and metal-organic frameworks (MOFs).

11. The energy storage device of claim 10, wherein said inactive filler is $SiO_2$.

12. The energy storage device of claim 1, wherein said high-voltage phosphate cathode is lithium iron phosphate ($LiFePO_4$).

\* \* \* \* \*